US011968290B2

(12) United States Patent
Rietman et al.

(10) Patent No.: US 11,968,290 B2
(45) Date of Patent: Apr. 23, 2024

(54) CIRCUIT COMPILING DEVICE AND CIRCUIT EVALUATION DEVICE

(71) Applicant: KONINKLIJKE PHILIPS N.V., Eindhoven (NL)

(72) Inventors: Ronald Rietman, Eindhoven (NL); Sebastiaan Jacobus Antonius De Hoogh, Noord Brabant (NL)

(73) Assignee: Koninklijke Philips N.V., Eindhoven (NL)

( * ) Notice: Subject to any disclaimer, the term of this patent is extended or adjusted under 35 U.S.C. 154(b) by 494 days.

(21) Appl. No.: 17/414,353

(22) PCT Filed: Dec. 13, 2019

(86) PCT No.: PCT/EP2019/085000
§ 371 (c)(1),
(2) Date: Jun. 16, 2021

(87) PCT Pub. No.: WO2020/126863
PCT Pub. Date: Jun. 25, 2020

(65) Prior Publication Data
US 2022/0029781 A1 Jan. 27, 2022

(30) Foreign Application Priority Data
Dec. 19, 2018 (EP) ...................... 18213936

(51) Int. Cl.
*H04L 9/00* (2022.01)
(52) U.S. Cl.
CPC .................... *H04L 9/004* (2013.01)
(58) Field of Classification Search
CPC ...................................................... H04L 9/004
See application file for complete search history.

(56) References Cited

U.S. PATENT DOCUMENTS

2003/0210740 A1 * 11/2003 Efland ................... H04L 45/00
375/222

FOREIGN PATENT DOCUMENTS

| CN | 107534550 A | * | 1/2018 | ............... G09C 1/00 |
| WO | 2017080769 A1 | | 8/2017 | |
| WO | 2020114999 A1 | | 6/2020 | |

OTHER PUBLICATIONS

Paul C. Kocher, Timing Attacks on Implementations of Diffie-Hellman, RSA, DSS, and Other Systems, Advances in Cryptology-CRYPTO96. Lecture Notes in Computer Science. 1109: 104-113 (1996).

(Continued)

*Primary Examiner* — Richard A McCoy

(57) ABSTRACT

Some embodiments are directed to a circuit compiling device for compiling a function into a binary circuit and a function evaluation device for evaluating a function using such a binary circuit. The binary circuit comprises conjunction subcircuits each computing a conjunction of function input bits and XOR subcircuits each computing a function output bit. Each function output bit may be represented as a sum of interpolation terms, the plurality of function input bits and the interpolation terms of the one or more function output bits together forming a plurality of interpolation terms. A conjunction subcircuit computes an interpolation term as a conjunction of two interpolation terms. A XOR subcircuit computes a function output bit as a XOR of interpolation terms. Thereby, the first interpolation term and second interpolation term are also used in XOR subcircuits, hence the binary circuit has a smaller number or likelihood of ineffective faults.

20 Claims, 7 Drawing Sheets

(56) References Cited

OTHER PUBLICATIONS

Side channel attack, Wikipedia https://en.wikipedia.org/wiki/Side-channel_attack (downloaded Jun. 4, 2021).

Christoph Dobraunig et al SIFA: Exploiting Ineffective Fault Inductions on Symmetric Cryptography, IACR Transactions on Cryptographic Hardware and Embedded Systems ISSN 2569-2925, vol. 2018, No. 3, pp. 547-572. DOI:10.13154/tches.v2018.i3.547-572.

Joyar, Joan & Peralta, René. (2011). A depth-16 circuit for the AES S-box . . . IACR Cryptology ePrint Archive. 2011.332. 10.1007/978-3-642-30436-1_24.

Ishai Y., Sahai A., Wagner D. (2003) Private Circuits: Securing Hardware against Probing Attacks. In: Boneh D. (eds) Advances in Cryptology—CRYPTO 2003. CRYPTO 2003. Lecture Notes in Computer Science, vol. 2729. Springer, Berlin, Heidelberg.

Tillich et al "Circuits of Basic Functions Suitable for MPC and FHE" Dec. 14, 2018.

Eldib et al: Synthesis of Fault-Attack Countermeasures for Cryptographic Circuits , Jul. 13, 2016 (Jul. 13, 2016), International Conference on Computer Ananysis of Images and Patterns. CAIP 2017: Computer Analysis of Images and Patterns; [Lecture Notes in Computer Science; Lect.Notes Computer] ,Springer, Berlin, Heidelberg, pp. 343-363.

Kiss Agnes et al: "Valiant's Universal Circuit is Practical", Apr. 28, 2016 (Apr. 28, 2016), International Conference On Computer Analysis of Images and Patterns. CAIP 2017: Computer Analysis of Images and Patterns; [Lecture Notes in Computer Science; Lect. Notes Computer], Springer, Berlin, Heidelberg, pp. 699-728.

Andi sheh Sarabi et al: "Design For Testability Properties of AND/XOR Networks", Jan. 1, 1993 (Jan. 1, 1993), XP055592998, Retrieved from the Internet: URL:https://pdfs.semanticscholar.org/6bcf/1632d9b35ee143b6aabc3e90f85a823c0a54.pdf.

Froessl J et al: "Module generation for AND/XOR-fields (XPLAs)", Proceedings of the International Conference on Computer Design—VLSI in Computers and Processors. Cambridge, MA., Oct. 14-16, 2019; [Proceedings of the International Conference on Computer Design—VLSI in Computers and Processors], Los Alamitos, IE,vol. -, Oct. 14, 1991 (Oct. 14, 1991), pp. 26-29.

Christoph Dobraunig et al: "SIFA:Exploiting Ineffective Fault Inductions on Symmetric Cryptography", IACR, International Association for Cryptologic Research vol. 20180904:115744 Sep. 4, 2018 (Sep. 4, 2018), pp. 1-26.

International Search Report and Written Opinion from PCT/EP2019/085000 dated Jun. 25, 2020.

\* cited by examiner

100'

8 12
4 0 2
2 1 0 1 4 AND
2 1 1 2 5 AND
2 1 4 5 6 AND
2 1 5 3 7 AND
2 1 0 4 8 XOR
2 1 8 6 10 XOR
2 1 6 5 9 XOR
2 1 9 7 11 XOR

100"

```
void eval(int i1, int i2, int i3,
    int i4, int* o1, int* o2) {
  int v1 = i1 & i2;
  int v2 = i2 & i3;
  int v3 = v1 & v2;
  int v4 = v2 & i4;
  *o1 = (i1 ^ v1) ^ v3;
  *o2 = (v3 ^ v2) ^ v4;
}
```

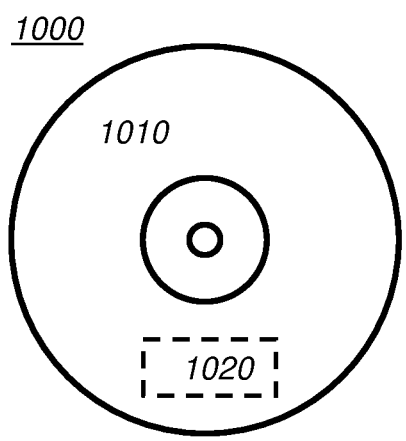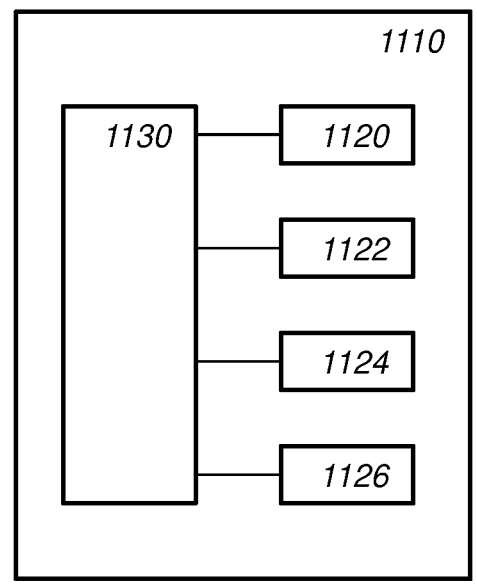
Fig. 7a                    Fig. 7b

CIRCUIT COMPILING DEVICE AND CIRCUIT EVALUATION DEVICE

CROSS-REFERENCE TO PRIOR APPLICATIONS

This application is the U.S. National Phase application under 35 U.S.C. § 371 of International Application No. PCT/EP2019/085000, filed on Dec. 13, 2019, which claims the benefit of EP Patent Application No. EP 18213936.0, filed on Dec. 19, 2018. These applications are hereby incorporated by reference herein.

FIELD OF THE INVENTION

The invention relates to a circuit compiling device, a circuit compiling method, a binary circuit, a function evaluation device, a function evaluation method, and a computer readable medium.

BACKGROUND OF THE INVENTION

Computations involving sensitive data, such as cryptographic computations, may be attacked by attackers of various kinds. For instance, a cryptographic primitive is called secure in the black-box model, if an attacker who only has knowledge of the inputs and outputs of the primitive cannot elevate his rights, e.g., obtain secret keys, encrypt messages, decrypt messages, etcetera. One example is symmetric encryption of a plaintext message with a key, giving a ciphertext. Anybody who knows the key can decrypt the ciphertext to obtain the plaintext. It is therefore important to keep the key secret to everyone, except of course the intended recipients of the message. Black-box security in this example means that having many plaintext-ciphertext pairs, it should not be feasible to find the key. For other types of computations involving sensitive information, for instance, in areas such as modelling, machine-learning, statistics, and the like, it is also relevant that an attacker cannot obtain the sensitive information used in the computation.

However, in practice attackers often do not operate in the black-box model, and in fact have more information than just the inputs and outputs. For example, in the grey-box model, it is assumed that an attacker has access to some information related to the implementation of the function. These additional sources of information are called 'side-channels'. For example, side-channels include the amount of time that an operation took, or the amount of power that was consumed, etc. It has been found that such side channels may be used to extract sensitive information from computations.

In an even stronger model, the so-called white-box model, an attacker has full access to all internal values of the computation. Attackers may also modify values, even as the computation is running. Even so, the white-box implementation aims to prevent the extraction of sensitive values from the computation. One known class of white-box attacks is differential fault analysis (DFA). In some DFA attacks, an attacker may induce a fault during the computation, and, from the change in output due to this fault, deduce information about sensitive information being processed. As a possible countermeasure against DFA, redundancy may be introduced in the computation. Introduction of faults that would change the output may be detected by observing a difference in the outputs of the redundant parts of the circuit. For example, the computation may be designed to give no output or a useless output.

Another class of white-box attacks is statistical ineffective fault analysis (SIFA). SIFA-type attacks rely on the possibility that faults can be induced in a computation that do not affect the computation output. Some SIFA attacks exploit the fact that intermediate values leading to an unaffected computation output may be non-uniformly distributed. For instance, there may be some dependency of an observation of an ineffective fault and the intermediate value that the fault was introduced to. In the context of AES, it has been shown that both software and hardware implementations can be attacked using SIFA.

Unfortunately, existing countermeasures against DFA and related types of attacks implicitly assume that the release of computation outputs that are unaffected by a fault does not leak sensitive information, and hence cannot prevent SIFA-type attacks. There is a need to remedy this situation.

SUMMARY OF THE INVENTION

To make SIFA attacks more difficult, it helps to reduce the number of ineffective faults, e.g., faults that do affect the computation output for some inputs but not for others. The inventors realized that it is particularly useful to reduce or even eliminate single-bit ineffective faults, e.g., introductions of faults in individual bits. Such single-bit faults may be exploited relatively easily, whereas faults involving more bits may be harder to find and/or exploit.

In order to better address one or more of the above concerns, circuit compiling and function evaluation devices are proposed as defined by the claims.

One aspect of the invention concerns a circuit compiling device for compiling a function into a binary circuit. Such a function may compute one or more function output bits from a plurality of function input bits. It is a known problem to compile binary circuits for functions that are in some sense optimized, e.g., for size, circuit depth, etc. Such a compiled circuit may be a hardware circuit, e.g., comprising physical gates being connected by physical wires, but also a software circuit, e.g., with software instructions as gates and memory locations as wires.

The binary circuit compiled by the device may comprise circuit wires including a plurality of circuit input wires corresponding to the plurality of function input bits and one or more circuit output wires corresponding to the one or more function output bits. The binary circuit may further comprise one or more conjunction subcircuits each computing a conjunction of at least two function input bits and one or more XOR subcircuits each computing a function output bit.

To compile the binary circuit, the circuit compiling device may represent each function output bit as a sum of interpolation terms. An interpolation term may be a product of zero or more function input bits. The plurality of function input bits and the interpolation terms of the one or more function output bits may together form a plurality of interpolation terms. It is understood that not all interpolation terms of the plurality of interpolation terms need to be terms of an interpolation formula, e.g., the function input bits may not be terms of an interpolation formula. The interpolation terms may also be referred to as available terms.

To compile a conjunction subcircuit for a current interpolation term, a first and second interpolation term may be selected from the plurality of interpolation terms such that the current interpolation term is computable as a product of the first and second interpolation terms. The conjunction subcircuit may compute a conjunction of the first and second interpolation terms. A selection error may be signaled if no such terms can be selected. A XOR subcircuit for a function output bit may be a XOR of interpolation terms that the function output bit is a sum of.

The circuit compiling device has as an advantage that the binary circuits it compiles have a reduced probability and/or number of ineffective faults, e.g., single-bit ineffective faults. The inventors realized that using XOR subcircuits for computing function output bits is beneficial since faults introduced in wires of XOR subcircuits always affect at least one function output bit, so they are not ineffective. The inventors also realized that, when computing an interpolation term that is used as an input to the XOR subcircuits, it is beneficial if the interpolation term is computed as a product of two other interpolation terms. Such other interpolation terms are typically used as inputs to XOR subcircuits so faults introduced in them may affect function output bits in this way. This can make them less likely to be ineffective, as explained in more detail below. If such other interpolation terms cannot be selected, a selection error is signaled so that producing a binary circuit with such ineffective faults is avoided. Although binary circuits compiled by the circuit compiling device may not be guaranteed to be free of ineffective faults, at least the number of ineffective faults is decreased and/or the probability that the binary circuit has ineffective faults is decreased, leading to an improvement in SIFA protection.

In an embodiment, each provided circuit wire corresponding to a current interpolation term may be used in at least one XOR subcircuit of the binary circuit. This may increase the probability that a fault in the wire affects a function output bit.

In an embodiment, the circuit compiling device may determine whether the binary circuit has an ineffective fault and, if the binary circuit has an ineffective fault, repeats at least the selecting and the compiling for one or more current interpolation terms. This way, various possibilities to construct the binary circuit may be tried and the chance of finding a circuit with few or no ineffective faults is increased. In an embodiment, the binary circuit may have an ineffective fault if a bit flip of a circuit wire affects at least one circuit output wire for a first instantiation of the plurality of circuit input wires and the bit flip affects no circuit output wires for a second instantiation of the plurality of circuit input wires, e.g., the fault may be a single-bit ineffective fault.

In an embodiment, determining whether the binary circuit has an ineffective fault may comprise, for each instantiation of a plurality of instantiations of the plurality of circuit input wires, determining a subset of the circuit wires of which a bit flip affects at least one circuit output wire; and determining that the binary circuit has an ineffective fault if a circuit wire is comprised in said subset of the circuit wires for a first instantiation of said plurality of instantiations but not for a second instantiation of said plurality of instantiations. This way, single-bit ineffective faults may be found relatively efficiently.

In an embodiment, the circuit compiling device may be configured to select a bijective function; compose the function with the bijective function; and combine the compiled binary circuit for the composed function with a binary circuit for an inverse of the bijective function. This way, if it is hard or impossible to compile a binary circuit with improved SIFA protection for the function directly, such a circuit may still be obtained indirectly. For instance, the device may repeat the selecting of the bijective function, the composing of the function with the bijective function, and the compiling of the composed function if a selection error is signaled. In such a way, a circuit with improved SIFA protection may eventually be found. In an embodiment, the bijective function is an affine mapping. This choice is beneficial since circuits without ineffective faults for bijective functions may be efficient to construct.

In an embodiment, a conjunction subcircuit may comprise a first negation of the first circuit wire, a second negation of the second circuit wire, a disjunction of the first negation and the second negation, and a negation of said disjunction. This may allow to construct circuits where the use of AND gates is impossible or undesirable, and/or may allow overall circuit optimizations leading to smaller circuits.

In an embodiment, the function may comprise a substitution box of a symmetric key algorithm. Symmetric key substitution boxes are an attractive target for white-box attacks and the inventors have found that the techniques described herein are effective for this type of function. In an embodiment, the function is injective. The inventors have found that the conjunction/XOR structure described herein is particularly effective for injective functions; in particular, faults on function input bits may always affect the output.

In an embodiment, at most one circuit wire may correspond to each interpolation term. Avoiding re-computation of interpolation term, e.g., increasing re-use of wires, may increase the chance that a fault in such a wire affects the computation output and hence renders the fault effective.

In an embodiment, the current interpolation term may be equal to the product of the first interpolation term and the second interpolation term. For various types of function, this choice may of first and second interpolation term may increase the eventual probability of ending up with a circuit without ineffective faults and/or on average decrease the number of ineffective faults.

A further aspect concerns a function evaluation device for evaluating a function. The function may compute one or more function output bits from a plurality of function input bits. Each function output bit may be representable as a sum of interpolation terms. An interpolation term may be a product of zero or more function input bits. The plurality of function input bits and the interpolation terms of the one or more function output bits may together form a plurality of interpolation terms.

The function evaluation device may be configured to store a binary circuit for the function, for example, a binary circuit compiled by a circuit compiling device as discussed above. The binary circuit may comprise circuit wires including a plurality of circuit input wires corresponding to the plurality of function input bits and one or more circuit output wires corresponding to the one or more function output bits. The binary circuit may further comprise one or more conjunction subcircuits each computing a conjunction of at least two function input bits. A conjunction subcircuit may provide a circuit wire corresponding to a current interpolation term as a conjunction of a first circuit wire corresponding to a first interpolation term and a second circuit wire corresponding to a second interpolation term. The binary circuit may further comprise one or more XOR subcircuits each computing a function output bit. The function output bit computed by a current XOR subcircuit may be representable as a sum of current interpolation terms. The current XOR subcircuit may provide a circuit output wire corresponding to the function output bit as a XOR of wires corresponding to said current interpolation terms. In an embodiment, the binary circuit can have no ineffective faults.

The function evaluation device may obtain the plurality of input bits and evaluate the function on the plurality of input bits by evaluating the binary circuit. Thereby, the function evaluation device may evaluate the function with a reduced attack surface for SIFA-type attacks, as discussed above.

Further aspects of the invention concern a circuit compiling method and a function evaluation method. Embodiments of the methods may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer. In an embodiment, the computer program comprises computer program code adapted to perform all the steps of an embodiment of the method when the computer program is run on a computer. Preferably, the computer program is embodied on a computer readable medium. A further aspect of the invention concerns a binary circuit compiled using the circuit compiling method, e.g., a hardware circuit comprising physical gates and wires or a software circuit comprising instructions on memory addresses.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings.

Figures 1A, 1B, 1C:
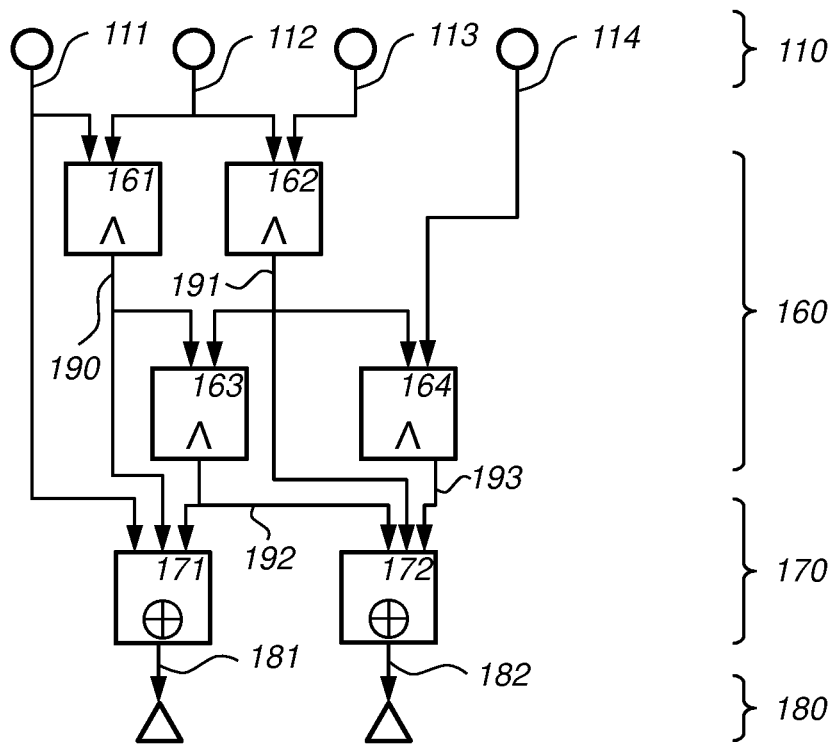
FIG. 1a schematically shows an example of an embodiment of a binary circuit.
FIG. 1b schematically shows an example of an embodiment of a binary circuit.
FIG. 1c schematically shows an example of an embodiment of a binary circuit.

LIST OF REFERENCE NUMERALS 100, 100', 100" a binary circuit
110a plurality of circuit input wires
111-114 a circuit input wire
160 one or more conjunction subcircuits
161-164 a conjunction subcircuit
170 one or more XOR subcircuits
171-172 a XOR subcircuit
180 one or more circuit output wires
181-182 a circuit output wire
190-193 an internal wire
200 a circuit compiling device
230 a processor
231 an interpolation unit
232 a conjunction compiler unit
233 a signaling unit
234 a XOR compiler unit
241 a function
242 a binary circuit
250 a plurality of interpolation terms
251-258 an interpolation term
260 one or more conjunction subcircuits
261-264 a conjunction subcircuit
270 one or more XOR subcircuits
271-272 a XOR subcircuit
300 a circuit compiling device
330 a processor
331 an interpolation unit
332 a conjunction compiler unit
333 a signaling unit
334 a XOR compiler unit
335 an ineffectiveness checking unit
341 a function
342 a binary circuit
350 a plurality of interpolation terms
351-358 an interpolation term
360 one or more conjunction subcircuits
361-364 a conjunction subcircuit
370 one or more XOR subcircuits
371-372 a XOR subcircuit
380 a plurality of ineffectiveness counters
400 a circuit compiling device
430 a processor
431 a bijection unit
432 a circuit compiling unit
433 a signaling unit
434 a combiner unit
440 a memory
441 a function
442 a binary circuit
443 a bijective function
500 a function evaluation device
530 a processor
531 a circuit evaluation unit
540 a memory
542 a binary circuit
543 a plurality of input bits
544 one or more output bits
600 a circuit compiling method
610 representing function output bits 620 selecting interpolation terms
630 signaling a selection error
640 compiling a conjunction subcircuit
650 compiling a XOR subcircuit
700 a circuit compiling method
710 representing function output bits
720 selecting interpolation terms
730 signaling a selection error
740 compiling a conjunction subcircuit
750 compiling a XOR subcircuit
760 determining an ineffective fault
800 a circuit compiling method
810 selecting a bijective function
820 composing the function with the bijective function
830 compiling a binary circuit for the composed function
831 signaling a selection error
840 combining the binary circuits
900 a function evaluation method
910 obtaining a binary circuit
920 obtaining the plurality of input bits
930 evaluating the function
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE
EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

In order to better explain various aspects, several attacks on computations are now discussed. As discussed, some attacks rely on side channels that leak information about internals of a computation, e.g., timing side channels, power usage side channels, etcetera. Attacks relying on such side channels may be passive, e.g., they may require only observing the implementation while it is performing its computations. In various attacks, however, an attacker can actively interfere with the execution of the algorithm, giving the attacker additional possibilities for extracting sensitive information. One such class of attacks is differential fault analysis (DFA). In some DFA attacks, an attacker may induce a fault during the computation, and, from the change in output due to this fault, deduce information about sensitive information being processed. As a possible countermeasure against DFA, redundancy may be introduced in the computation. Introduction of faults that would change the output may be detected by observing a difference in the outputs of the redundant parts of the circuit. For example, the computation may be designed to give no output or a useless output.

Another class of attacks is statistical ineffective fault analysis (SIFA). Some SIFA-type attacks rely on ineffective faults. An ineffective fault can be a fault that has no effect on the overall output of the computation for one or more inputs, but does have an effect on the overall output of the computation for one or more other inputs. An attacker may find input/output pairs for which a fault is ineffective. In such attacks, ineffectiveness of a fault may effectively be used as an indicator that an intermediate value of the computation is not uniformly distributed for these particular inputs, whereas it is uniformly distributed if the inputs are uniformly distributed. If non-uniformity occurs in an internal variable that is related to a relatively small part of the input or output and a relatively small amount of sensitive data, then it may be possible to derive information about this sensitive data.

For example, in various hardware-type attacks, e.g., based on lasers or clock glitches, the probability that an intermediate value of the computation remains unaffected by a fault in may be at least partially dependent on that intermediate value itself. As a consequence, observing whether such a fault has an effect can leak information. In white-box settings, an attacker can for instance simulate such faults by introducing a fault, e.g., a bit flip, in dependence on an intermediate value. Encoding values may not prevent this since the attacker can still choose to introduce the fault in dependence on the encoding.

Unfortunately, various existing countermeasures such as introducing redundancy to counter DFA may not have an effect if the output is not changed, and hence do not sufficiently protect against SIFA-type attacks.

Generally, in order to protect against SIFA attacks, it is beneficial to reduce the number of ineffective faults, especially in sensitive parts of the computation. For example, the computations may be performed in such a way that, for at least some values of the computation, a single bit flip in any share of the value likely affects the output. Eliminating such single-bit ineffective faults may be particularly advantageous since they may be exploited relatively easily by an attacker. For instance, looking for an ineffective single bit flip in a part of a computation with N operations may take order-N time, which may be feasible if N is not too large. On the other hand, looking for an ineffective fault with multiple (say k>1) bit flips in this same part of the circuit may take order $N^{\wedge}k$ and hence be more difficult.

In various embodiments, circuits are compiled and/or evaluated with reduced likelihood and/or number of ineffective faults, e.g., single-bit ineffective faults, making SIFA attacks more difficult.

Embodiments may be applied to various types of functions. Generally speaking, embodiments relate to functions $f$ computing one or more function output bits from a plurality of function input buts. Function $f$ may be part of a larger computation, e.g., a part of a computation that is particularly vulnerable to SIFA-type attacks and/or a part of the computation in which particularly sensitive information is processed. In an embodiment, function $f$ is injective or even bijective, or, at least, a small proportion of pairs of inputs are mapped to the same output, e.g., less than 10% or 1% of pairs. The inventors have found that, for injective or bijective functions, the binary circuits described herein are particularly suitable for SIFA protection, e.g., have particularly low likelihoods of having ineffective faults.

In various embodiments, function $f$ is a cryptographic function or is part of a cryptographic function: for such functions, protecting against SIFA-type attacks is especially relevant since they typically deal with sensitive information, e.g., key material, that needs to be protected. For example, function $f$ may be part of a block cipher evaluation, e.g., a block cipher-based encryption or decryption with a hard-coded key. In an embodiment, the function comprises a substitution box of a symmetric key algorithm, e.g., an AES S-box. For example, the substitution box may be applied on encoded inputs and/or outputs. In the case of AES, the inventors have found that applying the techniques described herein to parts of the AES computation with at most 8 bits of input already provides significant SIFA protection. For example, although AES comprises a MixColumns-operation that uses more than 8 bits, this is an additive operation and hence may be less susceptible to SIFA-type analysis, as explained below. Furthermore, computations that do not influence the AES path may not need to protected since a SIFA analysis on such computations may not provide information about internals of the AES calculation.

Although above, AES has been used as an example, the techniques below can be applied to other cryptographic primitives as well. For example, other block ciphers may be implemented as embodiments. Especially block ciphers of SLT design (Substitution/Linear transformation block ciphers, sometimes referred to as Substitution-permutation network (SPN) block ciphers), such as AES (Rijndael), 3-Way, Kuznyechik, PRESENT, SAFER, SHARK, and Square, can be adapted with little effort. The cryptographic function $f$ may be a symmetric primitive, e.g., wherein an encrypting/decrypting key is the same, or a signing/verification key. The cryptographic primitive may also be keyless, such as a hash function. Protecting hash functions may be important, as they may be applied to secret data. In fact, hash functions may be part of a keyed design, such as if the hash function is used in HMAC.

Various embodiments rely on the observation by the inventors that, given a function to be implemented by a binary circuit, there will be many different binary circuits implementing the function, but unless such a binary circuit is constructed in a special way, it will be very likely to contain ineffective faults. However, the inventors realized that the amount and/or likelihood of ineffective faults can be greatly reduced if circuits with a special structure are used. An example of such a special construction will now be provided. Let $f$ be a function that takes k bits as input, and gives l bits as output:

$$(y_1, \ldots, y_l) = f(x_1, \ldots, x_k),$$

for example, k=l in many cases, although this is not necessary.

For example, $f$ may be part of a larger calculation, e.g., the function may be a single S-box in an AES computation, e.g., k=l=8 in this case. For the AES S-box, binary circuits for AES are known that are optimized for various parameters, e.g., circuit depth, number of AND gates, etcetera. For example, "A depth-16 circuit for the AES S-box" by J. Boyar and René Peralta, IACR eprint 2011/322 (incorporated herein by reference) provides a circuit with depth 16 and 127 gates. Unfortunately, the inventors found that this circuit has many single-bit ineffective faults.

In order to find a circuit with less ineffective faults, e.g., less single-bit ineffective faults, output bits $y_j = f_j(x_1, x_2, \ldots, x_k)$ may be expanded as multinomials of the input, where each input bit appears with power 0 or 1, e.g., $$y_j = \bigoplus_{m_1=0}^{1} \bigoplus_{m_2=0}^{1} \ldots \bigoplus_{m_k=0}^{1} C_j(m_1, m_2, \ldots, m_k) x_1^{m_1} x_2^{m_2} \ldots x_k^{m_k}. \quad (1)$$

Coefficients $C_j(m_1, m_2, \ldots, m_k)$ may be given by $$C_j(m_1, m_2, \ldots, m_k) = \bigoplus_{x_1=0}^{m_1} \bigoplus_{x_2=0}^{m_2} \ldots \bigoplus_{x_k=0}^{m_k} f_j(x_1, x_2, \ldots, x_k).$$

In various embodiments, binary circuits implementing $f$ are constructed based on expression (1). For example, such circuits may comprise conjunction subcircuits in which interpolation terms, e.g., bit products $x_1^{m_1} x_2^{m_2} \ldots x_k^{m_k}$, may be calculated. Such circuits may also comprise XOR subcircuits in which function output bits may be calculated, e.g., by XORing bit products $x_1^{m_1} x_2^{m_2} \ldots x_k^{m_k}$ for which the coefficient $C_j(m_1, m_2, \ldots, m_k)=1$.

Interestingly, the inventors realized that in circuits of the above type, it is beneficial for SIFA protection if bit products $x_1^{m_1} x_2^{m_2} \ldots x_k^{m_k}$ for which all coefficients $C_j(m_1, m_2, \ldots, m_k)$ for $j \in \{1, \ldots, l\}$ are equal to zero are not computed in the binary circuit. As an example of why it is beneficial to avoid computation of such bit products, suppose that k=l=4 and that for $1 \leq j \leq 4$ it holds that $C_j(1,1,0,0)=0$. Now suppose that the variable $P_{12}=x_1 x_2$ is calculated in a conjunction subcircuit, and that it is reused in the various conjunction subcircuits only once to calculate $P_{124}=x_1 x_2 x_4$ as $P_{124}=P_{12} x_4$, and that at least one $C_j(1,1,0,1)$ is equal to 1. In this example, an attacker may flip $P_{12}$ after it is written, but before the calculation of $P_{124}$. Then, if $x_4=1$, any output bit $y_j$ for which $C_j(1,1,0,1)=1$ may be flipped, but if $x_4=0$, the output may be unaffected by the bit flip. Hence, an attacker can find an ineffective fault for these inputs. While avoiding the computation of such products does not generally guarantee that the resulting circuit does not have ineffective faults, constructing circuits that avoid computation of these products may at least decrease the likelihood and/or number of ineffective faults. Moreover, at least for circuits computed based on expression (1), avoiding the computation of such products may not needlessly limit the number of available binary circuits to choose from, in the sense that avoiding the computation may be necessary for the circuit to have no ineffective faults.

Based on the above observation, in various embodiments, a conjunction subcircuit for a given interpolation term computes the interpolation term as a conjunction of a first circuit wire corresponding to a first interpolation term and a second circuit wire corresponding to a second interpolation term. For instance, an interpolation term, e.g., a bit product $x_1^{m_1} x_2^{m_2} \ldots x_k^{m_k}$ for which at least one coefficient $C_j(m_1, m_2, \ldots, m_k)=1$, may be calculated as a conjunction $x_1^{m_1} x_2^{m_2} \ldots x_k^{m_k} = (x_1^{m'_1} x_2^{m'_2} \ldots X_k^{m'_k})(x_1^{m''_1} x_2^{m''_2} \ldots x_k^{m''_k})$ of wire corresponding to interpolation terms $(x_1^{m'_1} x_2^{m'_2} \ldots X_k^{m'_k})$, $(x_1^{m''_1} x_2^{m''_2} \ldots x_k^{m''_k})$. For example, the first and second interpolation term may be selected such that:

$$m_i = m'_i \vee m''_i \text{ for } 1 \leq i \leq k,$$

e.g., in order to guarantee that interpolation term $x_1^{m_1} x_2^{m_2} \ldots x_k^{m_k}$ indeed evaluates to the same value as the product of the first and second interpolation terms. The interpolation terms may also be selected such that the Hamming weights satisfy $$\Sigma_{i=1}^{k} m'_i < \Sigma_{i=1}^{k} m_i \text{ and } \Sigma_{i=1}^{k} m''_i < \Sigma_{i=1}^{k} m_i,$$

e.g., an interpolation term may be computed from interpolation terms computed from fewer input bits. Interestingly, the first interpolation term may be selected such that, for at least one $j \in \{1, \ldots, l\}$, coefficient $C_j(m'_1, m'_2, m'_k)=1$, e.g., the interpolation term is used in a XOR subcircuit. Similarly, the second interpolation term may be selected such that, for at least one j, coefficient $C_j(m''_1, m''_2, m''_k)=1$. The interpolation terms may also correspond to function input bits, e.g., a function input bit is not computed as part of the circuit so using it in a product may not cause a problem even if the function input bit is not used as an input of a XOR subcircuit. For instance, the function input bits and the interpolation terms that are used in XOR subcircuits may together form a plurality of interpolation terms, e.g., terms corresponding to wires that may be used as input wires for conjunction subcircuits. It is remarked that single bit flips in the 'XOR' part of the circuit may always be effective. Hence, in order to find binary circuits with few or no ineffective faults, the 'AND' part of the circuit may be varied.

Hence, compiling and/or using binary circuits with the above structure, e.g., comprising conjunction and/or XOR subcircuits and/or using interpolation terms in conjunction subcircuits that are also used as inputs XOR subcircuits, has the advantage that the number and/or likelihood of ineffective faults is reduced, for instance, compared to constructing binary circuits without taking special care that terms with $C_j(m'_1, m'_2, m'_k)=0$ for all j are not used as intermediate results. Even if the number of ineffective faults is not zero, advantages related to SIFA protection are still obtained. For example, the less ineffective faults there are, the more difficult it is to find one to mount an attack. Also, a party may generate many circuits according to the above construction as a service to another party that can then verify which of these circuits actually provide few or no ineffective faults; that can perform a probabilistic check to decease the likelihood of ineffective faults; that can perform spot checks to eliminate circuits with probabilistic faults, etcetera. Hence, various SIFA protection improvements are provided by binary circuits described herein.

FIG. 1a schematically shows an example of an embodiment of a binary circuit 100, e.g., a hardware circuit or a software circuit. The inventors realized that binary circuits with a structure similar to that of binary circuit 100 are particularly suitable to increase SIFA protection, as discussed in more detail later. Binary circuit 100 may be compiled using a circuit compiling method according to an embodiment. Binary circuit 100 may comprise a plurality of wires and a plurality of gates. A gate may compute one or more output wires of the gate from zero or more input wires of the gate.

In some embodiments, binary circuit 100 may be a hardware circuit. A gate of a hardware circuit may be a physical gate and a wire may be a physical wire leading from or to a gate. For example, the hardware circuit may be implemented in CMOS, e.g., using a hardware description language such as Verilog, VHDL etc.

In other embodiments, binary circuit 100 may be a software circuit. In such cases, gates may correspond to operations and wires may correspond to inputs and/or outputs of such operations. For example, a gate be represented as an identification of a type of operation or a set of instructions for performing the operation. A wire may be an identifier of such an input or output, e.g., a variable name, a memory location, and the like. Although binary circuit 100 is shown pictorially in FIG. 1a, it may be represented in various ways in memory, as shown for instance in FIG. 1b and FIG. 1c discussed below. The circuit may also be represented, e.g., using a hardware description language such as Verilog, VHDL etc.

A gate may compute one or more output wires of the gate from zero or more input wires of the gate. For example, well-known gates include AND gates, OR gates, XOR gates, NOT gates, etcetera. A gate may also be a constant gate that always provides the same value to its output wire, e.g., zero or one. A gate may have zero, one, two, or more than two input wires. A gate may have one or more than one output wire.

Binary circuit 100 may comprise a plurality 110 of circuit input wires. In this particular example, four circuit input wires 111, 112, 113, and 114 are shown but it will be understood that any number k>1 of circuit input wires can be used, e.g., 2, 3, at most or at least 8, at most or at least 16, etcetera. A circuit input wire may be for providing an input to the binary circuit. A circuit input wire may be an input wire to one or more gates of the circuit. Binary circuit 100 may also comprise one or more circuit output wires 180. A circuit output wire may be for obtaining an output of the binary circuit. For instance, in the figure, circuit output wires 181, 182 are shown. Any number l≥1 of circuit output wires can be used, e.g., 1, 2, at most or at least 8, at most or at least 16, etcetera. A circuit output wire may also be an input wire to one or more gates of the circuit. A circuit output wire may be a circuit input wire. In an embodiment, the number of circuit output wires is the same as the number of circuit input wires, but this is not necessary.

In addition to circuit input wires 110 and circuit output wires 180, binary circuit 100 typically comprises internal wires. An internal wire typically is an output wire of a gate of the binary circuit that serves as an input wire to one or more other gates of the binary circuit. For example, wires 190-193 are of FIG. 1a are internal wires, but binary circuit 100 typically also comprises additional internal wires, e.g., internal wires of XOR subcircuits 171, 172 discussed below. Binary circuit 100 typically does not comprise loops, e.g., no output wire of a gate is connected to an input wire of a gate directly or indirectly through other gates. The number of internal wires may be, e.g., at most or at least 1000 or at most or at least 10000.

Binary circuit 100 may be for computing a function $f$. Function $f$ may compute one or more function output bits from a plurality of function input bits, e.g., $f$ may be a binary function $f: \{0,1\}^k \to \{0,1\}^l$. For example, circuit input wires 110 may correspond to the function input bits, e.g., wires 111-114 may correspond to respective function inputs $x_1, x_2, x_3, x_4$. Circuit output wires 180 may correspond to the function output bits, e.g., wires 181-182 may correspond to respective function outputs $y_1, y_2$, where $(y_1, \ldots, y_l) = f(x_1, \ldots, x_k)$. Generally, when we say that a wire of binary circuit 100 "corresponds" to a function $f'(x_1, \ldots, x_k): \{0,1\}^k \to \{0,1\}$ of function input bits $x_1, \ldots, x_k$, we mean that, when circuit input wires 110 of circuit 100 are set to respective values $x'_1, \ldots, x'_k$ for the respective function input bits, evaluating the binary circuit 100 will lead to value $f'(x'_1, \ldots, x'_k)$ on that wire. For instance, function $f'$ may be a function output bit, an intermediate result of computing $f$, or a function input bit itself. For instance, evaluating binary circuit 100 on circuit input wires 110 with values $x_1 \in \{0,1\}, \ldots, x_k \in \{0,1\}$ may result in circuit output wires 180 with values $y_1 \in \{0,1\}, \ldots, y_l \in \{0,1\}$ such that $(y_1, \ldots, y_l) = f(x_1, \ldots, x_k)$.

Binary circuit 100 may compute a function output bit $y_i$ as a XOR of one or more of conjunctions, e.g., products/ANDs, of function input bits $x_i$. For example, binary circuit 100 may comprise one or more conjunction subcircuits 160 each computing a conjunction of at least two function input bits. Binary circuit 100 may also comprise one or more XOR subcircuits 170 each computing a function output bit as a XOR of wires corresponding to conjunctions, e.g., output bits of conjunction subcircuits, circuit input wires, and/or output wires of constant gates.

Binary circuit 100 may be based on representing each function output bit of function $f$ as a sum of interpolation terms. An interpolation term may be a product of zero or more function input bits. For instance, each function output bit may be representable in an algebraic normal form. As is known, binary functions generally admit such a representation. As an example, $f: (x_1, x_2, x_3, x_4) \mapsto (x_1 \oplus x_1 x_2 \oplus x_1 x_2 x_3, x_1 x_2 x_3 \oplus x_2 x_3 \oplus x_2 x_3 x_4)$ is a representation of a function $f$ as a XOR of products of function input bits. Note that function $f$ may have other representations as well, e.g., its first component may be represented $(x_1(1 \oplus x_2(1 \oplus x_3)))$, or $f$ may be represented at various stages as a table, and the like. The interpolation terms of the one or more function output bits and the plurality of function input bits $x_1$, $x_2$, $x_3$, $x_4$ may together form a plurality of interpolation terms, e.g., in the above example, the plurality of interpolation terms may be $\{x_1, x_1 x_2, x_1 x_2 x_3, x_2 x_3, x_2 x_3 x_4, x_2, x_3, x_4\}$.

Each of the one conjunction subcircuits 160 may compute a conjunction of at least two function input bits. Such a conjunction subcircuit may provide a circuit wire corresponding to a current interpolation term, e.g., in the above example binary circuit 100 may comprise a conjunction subcircuit for $x_1 x_2$, for $x_1 x_2 x_3$, for $x_2 x_3$, and for $x_2 x_3 x_4$. Interestingly, this circuit wire may be provided as a conjunction of a first circuit wire corresponding to a first interpolation term and a second circuit wire corresponding to a second interpolation term, e.g., both from the plurality of interpolation terms. For example, the first circuit wire may be an output of another conjunction subcircuit, a circuit input wire, or an output of a constant gate, and similarly for the second circuit wire. Computing interpolation terms as conjunctions of other interpolation terms is advantageous for improving SIFA protection, as discussed in more detail elsewhere.

For example, shown in the figure is a conjunction subcircuit 161 that computes a conjunction $x_1 x_2$, e.g., AND, of circuit input wires $x_1$, 111 and $x_2$, 112. For example, conjunction subcircuit 161 may comprise an AND gate computing its output wire as an AND of the circuit input wires. Similarly, conjunction subcircuit 162 in this example computes a conjunction $x_2 x_3$ of circuit input wires $x_2$, 112 and $x_3$, 113. A further conjunction subcircuit 163 in this example computes a conjunction $x_1 x_2 x_3$ of circuit input wires $x_1$, $x_2$, $x_3$, in this case, by computing a conjunction of the output wire of conjunction subcircuit 161 corresponding to $x_1 x_2$ and the output wire of conjunction subcircuit 162 corresponding to $x_2 x_3$. Another conjunction subcircuit 164 in this example computes a conjunction $x_2 x_3 x_4$ of circuit input wires $x_2$, $x_3$, $x_4$, in this case, by computing a conjunction of the output wire of conjunction subcircuit 162 corresponding to $x_2 x_3$ and circuit input wire $x_4$, 164.

Generally, in order for a conjunction subcircuit to compute a current interpolation term based on a first interpolation term and a second interpolation term, the set of function input bits of the current interpolation term may be the union of the set of function input bits of the first interpolation term and the set of function input bits of the second interpolation term. For instance, conjunction subcircuit 161 computes $x_1 x_2$ from $x_1$ and $x_2$, etcetera. In some embodiments, some or all current interpolation terms may be products of their respective first and second interpolation terms. For instance, for conjunction subcircuit 161, $x_1 x_2$ may be a product of $x_1$ and $x_2$. However, this is not necessary. For example, for conjunction subcircuit 163, $x_1 x_2 x_3$ may not be a product of $x_1 x_2$ and $x_2 x_3$, but since $x_2^2 = x_2$ if $x_2$ is a bit, interpolation term $x_1 x_2 x_3$ still takes on the same value as product $x_1 x_2^2 x_3$ of $x_1 x_2$ and $x_2 x_3$. As discussed elsewhere in more detail, an interpolation term being a product of the first and second interpolation term may decrease the likelihood of the binary circuit having ineffective faults.

Some or all interpolation subcircuits may compute their output wire from the first and second circuit wires by an AND gate, e.g., the interpolation subcircuit may comprise just this AND gate. This may minimize the size of the interpolation subcircuit. In other embodiments, the output wire is computed from the first and second circuit wires using a logical equivalent of the AND gate, for example, based on known NAND or NOR constructions. In an embodiment, at least one conjunction subcircuit comprises a first negation of the first circuit wire, a second negation of the second circuit wire, a disjunction of the first negation and the second negation, and a negation of said disjunction. In an embodiment, at least one conjunction subcircuit comprises a first NAND gate operating on the first circuit wire and second circuit wire and a second NAND gate with both input wires corresponding to the output wire of the first NAND gate. In an embodiment, at least one conjunction subcircuit comprises a first NOR gate with both input wires corresponding to the first circuit wire, a second NOR gate with both wires corresponding to the second circuit wire, and a third NOR gate with input wires corresponding to the outputs of the first and second NOR gate. Such implementations of conjunction subcircuits may be beneficial, e.g., in cases where AND gates are not available, and/or to allow various circuit optimizations based on the various forms that can lead to circuits that are smaller and/or can be evaluated more efficiently.

In some embodiments, if an interpolation term is used k>1 times in the computation, there can be fewer than k conjunction subcircuits 161-164 computing the interpolation term. In an embodiment, at most one circuit wire corresponds to each interpolation term, e.g., at most one conjunction subcircuit computes the interpolation term. This is preferred since, generally, the fewer different wires are used to represent the interpolation terms as input for the XOR subcircuits 170 discussed below, the more wires are re-used. This propagation of faults may decrease the likelihood of ineffective faults, and hence provide better SIFA protection. Generally, any re-use of interpolation terms in different XOR subcircuits may at least partially provide this advantage, e.g., compared to recomputing an interpolation term for each XOR subcircuit it occurs in. For instance, out of all interpolation terms that occur in sums for at least two function output bits, over 80% or over 90% may be computed at most once or twice. Preferably, each circuit wire that is provided for a current interpolation term is used in at least one XOR subcircuit of the binary circuit. For example, the same interpolation term may be computed by multiple circuit wires, but if each occurs in a XOR subcircuit, then still a fault in either one may affect the overall computation output, increasing the likelihood that such a fault is effective.

Each XOR subcircuit of binary circuit 100 may compute a function output bit, e.g., XOR subcircuit 171 may provide circuit output wire 181 computing function output bit $y_1$ and XOR subcircuit 172 may provide circuit output wire 182 computing function output bit $y_2$. For a function output bit representable as a sum of interpolation terms, the respective XOR subcircuit may provide its circuit output wire as a XOR of input wires corresponding to these interpolation terms. For instance, the interpolation terms may comprise a constant term 1, in which case the input wire corresponding to the term may be computed by a constant gate with an output wire producing the constant 1. The interpolation terms may also comprise a function input bit, in which case the input wire may be a circuit input wire. The interpolation terms may also comprise a product of at least two function input bits, in which case the input wire may be an output wire of a conjunction subcircuit 160.

Some function output bits may be representable by a sum of only one interpolation term, in which case the XOR subcircuit provides its input wire as an output wire, possibly via one or more gates that do not modify the input wire, e.g., an OR with 1. Some function output bits may also be identical to zero, in which case the XOR subcircuit can be a constant gate providing zero, an AND of a constant 0 and a constant 1, and the like. Generally, however, at least one of the XOR subcircuits 171-172 has multiple input wires corresponding to multiple interpolation terms.

For example, XOR subcircuit 171 in the figure may compute circuit output wire 181 computing function output bit $y_1 = x_1 \oplus x_1 x_2 \oplus x_1 x_2 x_3$ as a XOR of circuit input wire $x_1$, 111, of an output wire of conjunction subcircuit 161 computing $x_1 x_2$, and/or an output wire of conjunction subcircuit 163 computing $x_1 x_2 x_3$. Similarly, XOR subcircuit 172 in the figure may compute circuit output wire 182 computing function output bit $y_2 = x_1 x_2 x_3 \oplus x_2 x_3 \oplus x_2 x_3 x_4$ as a XOR of an output wire of conjunction subcircuit 163 computing $x_1 x_2 x_3$, an output wire of conjunction subcircuit 162 computing $x_2 x_3$, and/or an output wire of conjunction subcircuit 164 computing $x_2 x_3 x_4$.

XOR subcircuit 171 may compute the XOR of its input wires $w_1, \ldots, w_n$ in various ways. For example, XOR subcircuit 171 may comprise one or more XOR gates, each computing a XOR of input wires of the XOR subcircuit or outputs of other XOR gates of the XOR subcircuit. For example, a XOR of four input wires $w_1, w_2, w_3, w_4$ may be computed $(w_1 \oplus w_2) \oplus (w_3 \oplus w_4)$, as $w_1 \oplus (w_2 \oplus (w_3 \oplus w_4))$, etcetera. XOR gates may also be computed by means of other gates, e.g., using known constructions of XOR gates from NAND gates or NOR gates.

As discussed, circuits such as binary circuit 100 are particularly desirable from a SIFA protection point of view. For instance, circuits of the shape described above may have a decreased number of ineffective faults, and/or a decreased probability of having ineffective faults. As a particular example, the inventors have found that binary circuits as described above are particularly effective for random bijections having 8 function input bits and 8 output bits, although the invention is by no means limited to this case. For instance, the inventors have found that, for most 8-bit bijections, generating circuits according to the described structure may result in circuits with no ineffective faults at all in at least 0.1% of all cases, which may be sufficient for many applications, e.g., generating around 1000 circuits may often be sufficient to have at least one circuit without ineffective faults.

FIG. 1*b* schematically shows an example of an embodiment of a binary circuit 100'. FIG. 1*b* shows an example of how binary circuit 100 may be represented in memory as a software circuit. For example, a data representation of a binary circuit 100' may comprises a list of gate entries, a gate entry comprising a gate type and identifiers of input and/or output wires of the gate. For instance, in this figure, the circuit representation format of "Circuits of Basic Functions Suitable For MPC and FHE" by Stefan Tillich and Nigel Smart is used (available at https://homes.esatkuleuven.be/~nsmart/MPC/ and incorporated herein by reference). In this representation, the first line may comprise a total number of gates and a number of wires of the binary circuit. The second line may comprise a number of circuit input wires of a first party, a number of circuit input wires of a second party (not used here), and a number of circuit output wires. Following lines may represent gates, a representation comprising a number of input wires, a number of output wires, wire numbers of the input and output wires, and an identifier of the type of gate. For instance, wires 111, 112, 113, 114, 190, 191, 192, 193, 181, and 182 of binary circuit 100 may be numbered 0, 1, 2, 3, 4, 5, 6, 7, 10, and 11, respectively. Shown in the figure are gate representations of AND gates 161, 162, 163 and 164, of two XOR gates of XOR subcircuit 171 and of two XOR gates of XOR subcircuit 172, respectively.

FIG. 1*c* schematically shows an example of an embodiment of a binary circuit 100". FIG. 1*c* shows an example of how binary circuit 100 may be represented in memory as a software circuit. For example, a data representation of a binary circuit 100" may comprise an instruction or a set of instructions for each gate of the binary circuit. The set of instructions may be for computing one or more output values of the gate from zero or more input values of the gate, the values corresponding to the wires of the circuit. For example, a circuit wire may be a variable, a memory address, and the like. Shown in the figure is a C-like program for evaluating binary circuit 100, taking the input wires i1, 111, i2, 112, i3, 113, and i4, 114 and references to the output wires o1, 181, o2, 182 as arguments and computing internal wires v1, 190, v2, 191, v3, 192, v4, 193 as values of variables of the program.

Figure 2:
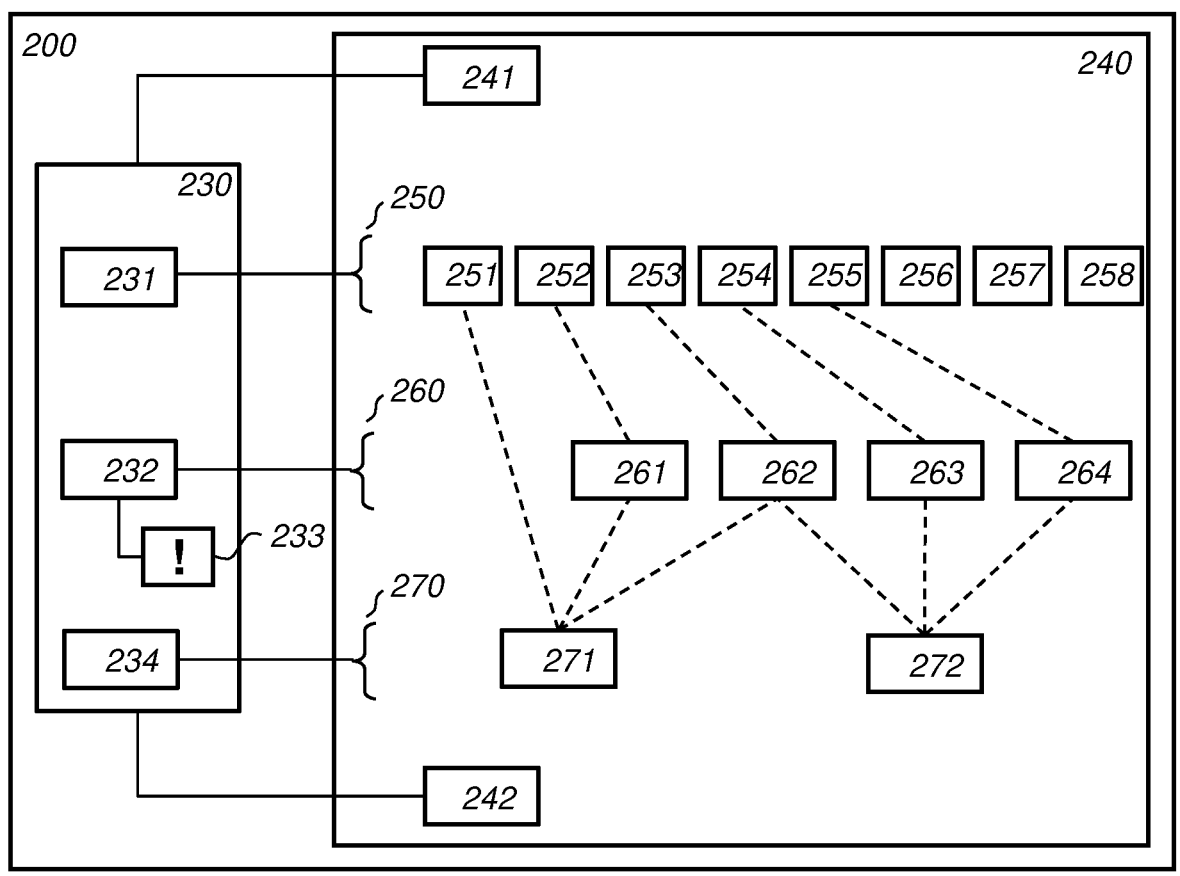
FIG. 2 schematically shows an example of an embodiment of a circuit compiling device, FIG. 3 schematically shows an example of an embodiment of a circuit compiling device, FIG. 4 schematically shows an example of an embodiment of a circuit compiling device, FIG. 5 schematically shows an example of an embodiment of a function evaluation device, FIG. 6a schematically shows an example of an embodiment of a circuit compiling method, FIG. 6b schematically shows an example of an embodiment of a circuit compiling method, FIG. 6c schematically shows an example of an embodiment of a circuit compiling method, FIG. 6d schematically shows an example of an embodiment of a function evaluation method, FIG. 7a schematically shows a computer readable medium having a writable part comprising a computer program according to an embodiment, FIG. 7b schematically shows a representation of a processor system according to an embodiment.

FIG. 2 schematically shows an example of an embodiment of a circuit compiling device 200 for compiling a function 241 into a binary circuit 242. Circuit compiling device 200 may comprise a processor 230 and/or a memory 240. Memory 240 may be used for data and/or instruction storage. For example, memory 240 may comprise software and/or data on which processor 230 is configured to act. Memory 240 may also store binary circuit 242. Processor 230 may be implemented as one or more processor circuits, e.g. microprocessors, ASICs, FPGA and the like. Memory 240 may comprise computer program instructions which are executable by processor 230. Processor 230, possibly together with memory 240, is configured according to an embodiment of a circuit compiler device.

Function $f$, 241 may compute one or more, e.g., l≥1, function output bits from a plurality, e.g., k>2, of function input bits, e.g., $(y_1, \ldots, y_l) = f(x_1, \ldots, x_k)$. Processor 230 may be configured to obtain function $f$. For example, function $f$ may be provided by a user, by another unit of device 200 such as a bijection unit as described herein, or by another party. Function $f$ may be obtained in various forms that enable processor 230 to obtain the function output bits given the function input bits, e.g., in the form of a table, of instructions executable by processor 230, as one or more polynomials, as a remote procedure call, etcetera. Function $f$ may be obtained, e.g., received, in the form of interpolation terms 250. As discussed above, function $f$ is preferably injective, e.g., function $f$ may be a bijection. The inventors have found that the techniques described herein work particularly well for injective/bijective functions. For example, the function may comprise a substitution box of a symmetric key algorithm.

Circuit compiling device compiles function 231 into binary circuit 242. Binary circuit 242 may be represented in various ways, e.g., as explained with respect to FIG. 1a-FIG. 1c. Binary circuit 242 may comprise circuit wires. The circuit wires of circuit 242 may include a plurality of circuit input wires corresponding to the plurality of function input bits. The circuit wires of circuit 242 may also include one or more circuit output wires corresponding to the one or more function output bits. Circuit 242 may also comprise one or more conjunction subcircuits 260 each computing a conjunction of at least two function input bits. The circuit 242 may further comprise one or more XOR subcircuits 270 each computing a function output bit. For example, binary circuit 242 may be circuit 100, 100', or 100".

Circuit compiling device 200 may comprise an interpolation unit 231 configured to represent each function output bit as a sum of interpolation terms. Such an interpolation term may be a product of zero or more function input bits. The interpolation terms of the one or more function output bits may, together with the plurality of function input bits, form plurality of interpolation terms 250. In some embodiments, interpolation unit 231 obtains, e.g., receives, interpolation terms 250 as part of obtaining function 241. In other embodiments, interpolation unit 231 computes the plurality of interpolation terms 250 based on function 241. Various techniques for polynomial/multinomial interpolation are known and may be applied in interpolation unit 231. For example, computing interpolation terms 250 may comprise determining interpolation coefficients corresponding to multinomials of the function input bits with respect to the function output bits, and selecting interpolation terms having nonzero interpolation coefficients for at least one function output bit. For example, output bits $y_j = f_j(x_1, x_2, \ldots, x_k)$ may be expanded as multinomials of the input, where each input bit appears with power 0 or 1, e.g., $$y_j = \bigoplus_{m_1=0}^{1} \bigoplus_{m_2=0}^{1} \ldots \bigoplus_{m_k=0}^{1} C_j(m_1, m_2, \ldots, m_k) x_1^{m_1} x_2^{m_2} \ldots x_k^{m_k}.$$

An interpolation term $x_1^{m_1} x_2^{m_2} \ldots x_k^{m_k}$ of the plurality of interpolation terms, e.g., with $C_j(m_1, m_2, \ldots, m_k)=1$, may be a product of zero function input bits, e.g., $(m_1, \ldots, m_k)=(0, \ldots, 0)$ corresponding to the constant interpolation term 1; a product $x_j$ of one function input bit, e.g., exactly one $m_j=1$; or a product of multiple function input bits, e.g., multiple $m_j$ are one.

Interpolation unit 231 may determine an interpolation coefficient $C_j(m_1, m_2, \ldots, m_k)$ for an interpolation term with respect to an output bit by computing the output bit in a set of points based on the coefficient and computing a sum thereof, e.g., $$C_j(m_1, m_2, \ldots, m_k) = \bigoplus_{x_1=0}^{m_1} \bigoplus_{x_2=0}^{m_2} \ldots \bigoplus_{x_k=0}^{m_k} f_j(x_1, x_2, \ldots, x_k).$$

For example, interpolation unit 231 may obtain function $f: (x_1, x_2, x_3, x_4) \mapsto (x_1(1 \oplus x_2(1 \oplus x_3), x_2x_3(x_1 \oplus 1 \oplus x_4))$ and determine that $C_1(1,0,0,0)=C_1(1,1,0,0)=C_1(1,1,1,0)=1$;
$C_2(1,1,1,0)=C_2(0,1,1,0)=C_2(0,1,1,1)=1$;
and $C_j(m_1, m_2, m_3, m_4)=0$ for other $j, m_1, m_2, m_3, m_4$.

Hence, in this example, interpolation unit 231 may represent the first function output bit of function 241 as a sum of interpolation terms $x_1$, 251; $x_1x_2$, 252; and $x_1x_2x_3$, 253, e.g., $y_1 = x_1 \oplus x_1x_2 \oplus x_1x_2x_3$. Similarly, interpolation unit 231 may represent the second function output bit of function 241 as a sum of interpolation terms $x_1x_2x_3$, 253, $x_2x_3$, 254, and $x_2x_3x_4$, 255, e.g., $y_2 = x_1x_2x_3 \oplus x_2x_3 \oplus x_2x_3x_4$. Interestingly, in some embodiments, interpolation terms for function outputs bits overlap, e.g., an interpolation term, e.g., $x_1x_2x_3$, 253 occurs in the sum for both a first function output bit $y_1$ and a second function output bit $y_2$. This may enable re-use of wire corresponding to these interpolation terms in multiple XOR subcircuits, which may improve the propagation of introduced faults throughout the computation, e.g., decreasing the likelihood of ineffective faults.

The plurality of interpolation terms 250 may also comprise function input bits that do not occur as a summand in a sum of a function output bit, e.g., shown in the figure are function inputs bits $x_2$, 256; $x_3$, 257; and $x_4$, 258. Such interpolation terms may be used in conjunction subcircuits even if they do not occur in a sum of a function output bit since they may not be not intermediate results of the binary circuit and hence some of the SIFA-type attacks described above may not apply to them.

Circuit compiling device 200 may further comprise a conjunction compiler unit 232. Conjunction compiler unit 232 may compile a conjunction subcircuit for each interpolation term of plurality 250 of interpolation terms that is a product of multiple function input bits. For instance, in the example shown in FIG. 2, circuit compiling device 200 may compile a conjunction subcircuit 261 for interpolation term 252, a conjunction subcircuit 262 for interpolation term 253, a conjunction subcircuit 263 for interpolation term 254, and/or a conjunction subcircuit 263 for interpolation term 255. Each compiled conjunction subcircuit 261-264 may compute the respective interpolation term 252-255. Preferably, conjunction compiler unit 232 compiles only one conjunction subcircuit for each interpolation term, e.g., one circuit wire corresponds to each interpolation term. Although it is possible to compile multiple conjunction subcircuits for an interpolation term, as discussed above, this may increase the number and/or probability of ineffective faults.

In an embodiment, circuit compiling device 200 compiles conjunction subcircuits in order of increasing degree of the corresponding interpolation terms, e.g., increasing number of function input bits that comprise the interpolation term. This may be convenient since circuits for higher-degree interpolation terms may use wires of circuits for lower-degree interpolation terms. However, this is not necessary and in general, the conjunction subcircuits can be compiled in any order.

The conjunction subcircuit for a current interpolation term compiled by conjunction compiler unit 232 may compute the current interpolation term as a product of a first interpolation term and a second interpolation term, both from plurality of interpolation terms 250. As discussed in more detail elsewhere, this may help to improve SIFA protection since the first and second interpolation term may also be used by XOR subcircuits of binary circuit 242 to compute function output bits and/or to compute other interpolation terms. Hence, the inputs used to compute the current interpolation term may be such that a fault is more likely to affect the overall computation result, e.g., decreasing the number and/or probability of ineffective faults.

Conjunction compiler unit 232 may be configured to select this first and second interpolation term from plurality 250 such that the current interpolation term is computable as a product of the first interpolation term and the second interpolation term. For instance, the set of function input bits of which the current interpolation term is a product may be the union of the set of function input bits of which the first interpolation term is a product and the set of function input bits of which the second interpolation term is a product. The first and/or second interpolation terms are typically products of at least one function input bit, e.g., they may be single input bits or products of multiple input bits.

For instance, conjunction compiler unit 232 may select first interpolation term $x_1$, 251 and second interpolation $x_2$, 256 for current interpolation term $x_1x_2$, 252. Conjunction compiler unit 232 may select first interpolation term $x_2$, 256 and second interpolation term $x_3$, 257 for current interpolation term $x_2x_3$, 253. Conjunction compiler unit 232 may select first interpolation term $x_1x_2$, 252 and second interpolation term $x_2x_3$, 253 for current interpolation term $x_1x_2x_3$, 254. Conjunction compiler unit 232 may select first interpolation term $x_2x_3$, 253 and second interpolation term $x_4$, 258 for current interpolation term $x_2x_3x_4$, 255. For example, these choices may lead to binary circuit 100 as discussed above.

Typically, for at least some current interpolation terms, conjunction compiler unit 232 can choose between multiple combinations of first and second interpolation terms. For instance, interpolation term $x_1x_2x_3$, 254 may be computed as a conjunction of interpolation term $x_1x_2$, 252 and interpolation term $x_2x_3$, 253, since for all bits $x_1$, $x_2$, $x_3$, interpolation term $x_1x_2x_3$ is equal to $x_1x_2 \cdot x_2x_3 = x_1x_2^2x_3$. Interpolation term 254 may also be computed as a product of interpolation term $x_1$, 251 and output $x_2x_3$ of conjunction subcircuit 253. Especially for functions that are more complex and/or have more output bits, it may be common for conjunction compiler unit 232 to have a choice between multiple combinations of interpolation terms.

Conjunction compiler unit 232 may choose between multiple possible combinations of first and second interpolation terms in many different ways. For example, conjunction compiler unit 232 may randomly choose a combination from the set of possible combinations. This may be relatively efficient to implement, e.g., no bookkeeping is performed. Conjunction compiler unit 232 may also systematically choose a combination, for example, if conjunction compiler unit 232 is called repeatedly to select first and second interpolation terms for the same current interpolation term as discussed elsewhere, conjunction compiler unit 232 may select a combination that was not previously selected or it may select a combination that was not previously selected together with combinations selected for other current interpolation terms. Such systematic approaches may have the advantage that each combination is eventually tried out, e.g., if there is a selection that leads to a SIFA-resistant circuit it may be eventually tried out. Conjunction compiler unit 232 may also employ various heuristics, e.g., favoring or not favoring products of few interpolation terms, favoring or nor favoring overlap between the first and second interpolation term, etcetera.

In an embodiment, conjunction compiler unit 232 may select the first interpolation term and the second interpolation term such that the current interpolation term is equal to the product of the first interpolation term and the second interpolation term. For example, conjunction compiler unit 232 may select interpolation term $x_2x_3$, 253 and interpolation term $x_4$, 258 for interpolation term $x_2x_3x_4$, 255. Conjunction compiler unit 232 may in such embodiments not select first interpolation term $x_1x_2$, 252 and selected second interpolation term $x_2x_3$, 253 for interpolation term $x_1x_2x_3$, 254. Although selecting current interpolation terms as products decreases the number of possible combinations, for certain types and sizes of circuits it may result in beneficial circuits, e.g., with a lower number/probability of ineffective faults. Conjunction compiler unit 232 may also combine different strategies, e.g., in a first phase, try to compile a binary circuit using products and, if this does not result in desirable circuits, apply a second phase in which binary circuits are compiled with interpolation terms that are not necessarily computed as products.

In some cases, conjunction compiler unit may not be able to select a first interpolation term and second interpolation term such that the current interpolation term is computable as a product of the first and second interpolation terms. For instance, no such interpolation terms may exist, e.g., the plurality of interpolation terms could comprise a product $x_1x_3x_4$ but none of the products $x_1x_3$, $x_1x_4$, or $x_3x_4$. It could also be that all combinations of first and second interpolation terms have been tried out for all current interpolation terms, although for larger circuits this may be relatively unlikely.

Interestingly, circuit compiling device 200 comprises a signaling unit 233 that, in such cases, signals a selection error. Typically, the signaling of the selection error causes the compiling of the current circuit to be aborted. For example, circuit compiling device 200 does not compile a subcircuit that computes the current interpolation term in a different way than as a product of two interpolation terms. This may have the advantage that, in circuits output by circuit compiler 200, current interpolation terms that are products of multiple function input bits are always computed as products of interpolation terms, and hence, the circuits output by circuit compiler 200 may have lower probability and/or lower number of ineffective faults.

Various reactions to signaling unit 233 signaling a selection error are possible. For instance, a new function may be selected for compiling into a binary circuit, e.g., if the function is an encryption with a random key, a different random key may be chosen; if the function operates on values encoded with a random encoding, a different encoding may be chosen, etcetera. The function may also be adapted, e.g., by composing it with a different function according to various embodiments described herein. Circuit compiler function may also, for instance, be configured to attempt compile binary circuits for an obtained plurality of functions, and to only output the binary circuits for those functions that did not trigger a selection error.

Having selected a first and second interpolation term, if no selection error is signaled then conjunction compiler unit 232 may compile a conjunction subcircuit of the binary circuit computing the current interpolation term. For instance, conjunction compiler unit 232 may provide a circuit wire corresponding to the current interpolation term as a conjunction of a first circuit wire corresponding to the first interpolation term and a second circuit wire corresponding to the second interpolation term. Conjunction compiler unit 232 may store the resulting subcircuit in memory 240.

For instance, conjunction subcircuit 261 may compute interpolation term $x_1x_2$, 252 as a conjunction of a circuit input wire corresponding to $x_1$ and a circuit input wire corresponding to $x_2$. Conjunction subcircuit 262 may compute interpolation term $x_2x_3$, 253 as a conjunction of a circuit input wire corresponding to $x_2$ and a circuit input wire corresponding to $x_3$. Conjunction subcircuit 263 may compute interpolation term $x_1x_2x_3$, 254 as a conjunction of an output wire of conjunction subcircuit 261 and an output wire of conjunction subcircuit 262. Conjunction subcircuit 264 may compute interpolation term $x_2x_3x_4$, 255 as a conjunction of an output wire of conjunction subcircuit 262 and a circuit input wire corresponding to $x_4$.

In some embodiments, the compiled conjunction subcircuit comprises an AND gate with the first circuit wire and the second circuit wire as inputs and the circuit wire corresponding to the current interpolation term as outputs. This may minimize the size of the present conjunction subcircuit. However, other circuits are possible, e.g., logical equivalents to the AND gate, as discussed with respect to the conjunction subcircuits of binary circuit 100. For example, in an embodiment, a conjunction subcircuit comprises a first negation of the first circuit wire, a second negation of the second circuit wire, a disjunction of the first negation and the second negation, and a negation of said disjunction.

Circuit compiling device 200 may further comprise a XOR compiler unit 234 configured to compile one or more XOR subcircuits 270 of binary circuit 242. For instance, XOR compiler unit 234 may compile a XOR subcircuit for each function output bit of function 241. Shown in the figure, by way of example, are XOR subcircuit 271 and XOR subcircuit 272. For a current function output bit represented as a sum of current interpolation terms, the XOR subcircuit output by XOR compiler unit 234 may provide a circuit output wire corresponding to the current function output bit as a XOR of wires corresponding to these current interpolation terms. XOR compiler unit 234 may store the resulting subcircuit in memory 240.

For example, interpolation unit 231 may have represented the first function output bit of function 241 as a sum of interpolation terms $x_1$, 251; $x_1x_2$, 252; and $x_1x_2x_3$, 253, e.g., $y_1=x_1 \oplus x_1x_2 \oplus x_1x_2x_3$. XOR compiler unit 234 may then provide its output wire as a XOR or function input wire $x_1$, an output wire of conjunction subcircuit 261 corresponding to interpolation term $x_1x_2$, 252, and an output wire of conjunction subcircuit 262 corresponding to interpolation term $x_1x_2x_3$, 253. Similarly, interpolation unit 231 may have represented the second function output bit of function 241 as a sum of interpolation terms $x_1x_2x_3$, 253, $x_2x_3$, 254, and $x_2x_3x_4$, 255, e.g., $y_2=x_1x_2x_3 \oplus x_2x_3 \oplus x_2x_3x_4$. XOR compiler unit 234 may then provide its output wire as a XOR of an output wire of conjunction subcircuit 262 corresponding to interpolation term $x_1x_2x_3$, 253, an output wire of conjunction subcircuit 263 corresponding to interpolation term $x_2x_3$, 254, and an output wire of conjunction subcircuit 264 corresponding to interpolation term $x_2x_3x_4$, 255. As discussed with respect to XOR subcircuits 170 of binary circuit 100, a XOR subcircuit may comprise XOR gates or their logical equivalents, and may compute XORs in various orders e.g., subcircuit 272 may compute $(x_1x_2x_3 \oplus x_2x_3) \oplus x_2x_3x_4$, $x_1x_2x_3 \oplus (x_2x_3 \oplus x_2x_3x_4)$, $(x_1x_2x_3 \oplus x_2x_3x_4) \oplus x_2x_3$, etcetera.

The result of compiling the conjunction subcircuits 260 and XOR subcircuits 270 may be binary circuit 242 computing function 241. Binary circuit 242 may be stored in memory 240. The representation of binary circuit 242 may comprise an ordering of conjunction subcircuits and/or XOR subcircuits corresponding to an order in which the subcircuits are to be evaluated or an ordering of the gates of all subcircuits corresponding to an order in which the gates are to be evaluated. Evaluations of gates of multiple subcircuits may be interleaved, e.g., between a first and second gate of a first conjunction subcircuit, a gate of another conjunction subcircuit may be evaluated. For example, the ordering of binary circuit 242 may correspond to the order in which units 232 and 234 have generated the respective subcircuits. Processor 230 may also be additionally configured to modify the ordering of gates, e.g., to randomly change the order in which gates are to be evaluated subject to the constraint that a gate is computed after any gate used to compute its inputs. Since the ordering of the gates may affect the presence and/or number of ineffective faults, reordering gates, e.g., randomly, may have as an advantage that the number and/or probability of ineffective faults is reduced, or at least that there are additional possibilities to obtain a SIFA-resistant binary circuit 242.

Circuit compiling device 200 may be able to generate a very large set of circuits each implementing the same function 241. Circuit compiling device 200 may find a circuit from this set that has no ineffective faults in a randomized way, if this set contains such a circuit. In particular, for each interpolation term with Hamming weight k there may be $O(3^k)$ ways to calculate it from two interpolation terms with lower Hamming weights; if all interpolation terms are to be calculated, the number may be $(3^k-2^{k+1}+1)/2$ and it may be less if some interpolation terms are not calculated. As a consequence, the number of different sets of conjunction subcircuits may be very large: for n=8 and a bijective function $f$, 241 for which all interpolation terms with Hamming weights 2, ... , 7 are computed, the number of realizations of the conjunction, e.g., 'AND', part of binary circuit 242 may be approximated as:

$$\prod_{k=2}^{7}\left(\frac{3^k-2^{k+1}+1}{2}\right)^{\binom{8}{k}} \approx 1.86 \cdot 10^{320}.$$

This estimate does not take into account the order in which the interpolation terms are calculated: for instance, all interpolation terms with the same Hamming weight may be calculated in arbitrary order, etcetera. If interpolation terms are selected as products of respective first and second interpolation terms, e.g., the aforementioned condition $m_i=m'_i \vee m''_i$ is replaced by $m_i=m'_i+m''_i$, so that, if $m_i=1$, either $m'_i$ or $m''_i=1$, but not both, then the number of circuits in the set may be lower. For example, the number $(3^k-2^{k+1}+1)/2$ above may become $2^{k-1}-1$, and the maximum number of realizations of the 'AND' part may be approximately $7.76 \cdot 10^{208}$. In practice this may still be enough, e.g., to find binary circuits without ineffective faults.

Figure 3:
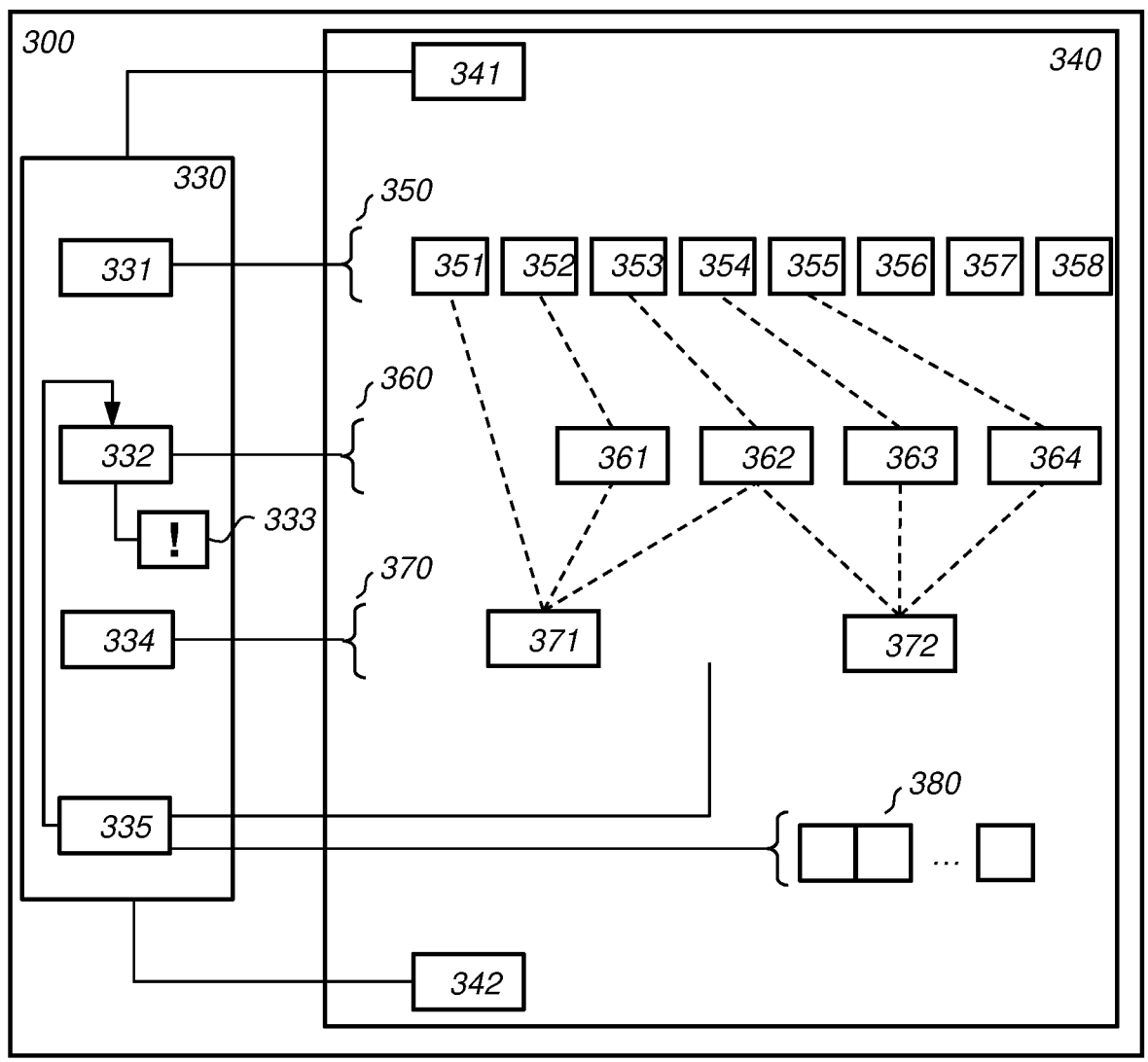

FIG. 3 schematically shows an example of an embodiment of a circuit compiling device 300. Circuit compiling device 300 is for compiling a function 341 into a binary circuit 342. Circuit compiling device may comprise a processor 330 and/or a memory 340. Memory 340 may be used for data and/or instruction storage. For example, memory 340 may comprise software and/or data on which processor 330 is configured to act. Memory 340 may also store binary circuit 342. Processor 330 may be implemented as one or more processor circuits, e.g. microprocessors, ASICs, FPGA and the like. Memory 340 may comprise computer program instructions which are executable by processor 330. Processor 330, possibly together with memory 340, is configured according to an embodiment of a circuit compiler device. For example, circuit compiling device 300 may be based on circuit compiler device 200, its units being based on the respective units of device 200.

Circuit compiling device 300 may comprise an interpolation unit 331 configured to represent each function output bit as a sum of interpolation terms, the plurality of function input bits and the interpolation terms of the one or more function output bits together forming a plurality of interpolation terms 350. For example, shown in the figure are interpolation terms 351-358. Interpolation unit 331 may be based on interpolation unit 231.

Circuit compiling device 300 may comprise a conjunction compiler unit 332 configured to compile conjunction subcircuits 360 for each current interpolation term of the plurality of interpolation terms 350. For example, shown in the figure are conjunction subcircuit 361 compiled for interpolation term 352, conjunction subcircuit 362 compiled for interpolation term 353, conjunction subcircuit 363 compiled for interpolation term 354, and conjunction subcircuit 364 compiled for interpolation term 355. In order to compile a conjunction subcircuit, conjunction compiler unit 332 may select a first interpolation term and a second interpolation such that the current interpolation term is computable as a product of the first interpolation term and the second interpolation term. If no first interpolation term and second interpolation term can be selected, a signaling unit 333 may signal a selection error. For example, conjunction compiler unit 332 may be based on conjunction compiler unit 232 and/or signaling unit 333 may be based on signaling unit 233.

Circuit compiling device 300 may further comprise a XOR compiler unit 334 configured to compile one or more XOR subcircuits 370 of the binary circuit, e.g., XOR subcircuit 371 and XOR subcircuit 372. For example, XOR compiler unit 334 may be based on XOR compiler unit 234.

Interestingly, circuit compiling device 300 further comprises an ineffectiveness checking unit 335. Ineffectiveness checking unit 335 may be configured to determine whether compiled binary circuit 342 has an ineffective fault. For example, ineffectiveness checking unit 335 may determine with confidence of 100% that compiled binary circuit 342 has no ineffective faults, which may have as an advantage that binary circuits 342 with ineffective faults are prevented, or with at least a minimum confidence, e.g., at least 50% or at least 90%, that binary circuit 342 has no ineffective faults, which may have as advantage that the probability and/or the number of ineffective faults is reduced.

In an embodiment, binary circuit 452 may have an ineffective fault if a bit flip of a circuit wire, e.g., a single-bit fault, affects at least one circuit output wire for a first instantiation of the plurality of circuit input wires of the binary circuit and the bit flip affects no circuit output wires for a second instantiation of the plurality of circuit input wires. For instance, ineffectiveness checking unit 335 may check for single-bit ineffective faults. A bit flip may refer to a value on a particular wire being changed to 1 if it is 0 and to 1 if it is 0. Such a bit flip may occur at any time after the wire has been set, e.g., before the first time it is used, before the second time it is used, etc.

For example, a bit flips of an output wire of an AND gate may be characterized by two numbers m and r. The number $m=\Sigma_{i=0}^{n-1} m_i 2^i$ may indicates a circuit wire that represents the bit product $X_1^{m_1} X_2^{m_2} \ldots X_k^{m_k}$. The number r may indicates when the wire is flipped, e.g., r=0 may indicates that the wire is flipped right after it is calculated and a positive value may indicate that it is flipped after the r-th time it is used as an input to another gate. In order to check whether the circuit has ineffective faults, it may be sufficient to check the output wires of AND gates, as discussed above. Hence, ineffectiveness checking unit 335 may check if binary circuit 342 has an ineffective fault by evaluating the circuit for all (m,r) and all possible $2^k$ inputs, e.g., evaluated by circuit evaluation unit 531, and checking whether fault (m,r) is ineffective, e.g., whether it either affects the output for some inputs but not others.

If binary circuit 342 has an ineffective fault, then circuit compiling device 300 may compile a new binary circuit for function 341. For example, the checking and the compiling of a new binary circuit may be repeated until it is determined that binary circuit 342 has no ineffective faults and/or until a maximum number of tries has been reached, until a maximum amount of resources has been spent, etc. Compiling a new binary circuit may comprise at least having conjunction compiler unit 332 repeat the selecting and the compiling for one or more current interpolation terms, for example, for all interpolation terms 361-364.

Any selection of new first and second interpolation terms by conjunction compiler unit 332 may change binary circuit 342 from having ineffective faults to not having ineffective faults. For example, after repeating the selecting and the compiling for one of more current interpolation terms, ineffectiveness checking unit 335 may check whether the particular ineffective fault has disappeared and if not, perform more selecting and compiling for the same or additional current interpolation terms. After the particular ineffective fault has been remedied, ineffectiveness checking unit 335 may optionally check whether the binary circuit 342 has no ineffective faults at all.

In an embodiment, ineffectiveness checking unit 335 may determine whether binary circuit 342 has an ineffective fault by, for each instantiation of a plurality of instantiations of the plurality of circuit input wires, determining a subset of the circuit wires of which a bit flip affects at least one circuit output wire. The plurality of instantiations may comprise all possible instantiations of the circuit input wires, but this is not necessary, e.g., a probabilistic check may be performed in which not all inputs are checked, or ineffectiveness checking unit 335 may stop checking if an ineffective fault has been found.

Memory 340 may comprise ineffectiveness counters 380 for each circuit wire, and ineffectiveness checking unit 335 may increase the ineffectiveness counter for a circuit wire if the bit flip affects an output wire. Ineffectiveness checking unit 335 may determine that binary circuit 342 has an ineffective fault if a circuit wire is comprised in said subset of the circuit wires for a first instantiation of said plurality of instantiations but not for a second instantiation of said plurality of instantiations, e.g., if the ineffectiveness counter 380 for a circuit wire is not equal to either 0 or the number of instantiations of the inputs for which the subset is determined.

For example, ineffectiveness checking unit 335 may employ a procedure such as the following to determine whether circuit 342 has ineffective faults: for a particular instantiation of the plurality of circuit input wires, evaluate binary circuit 342 to obtain values for each wire of the circuit. Circuit wires may be analyzed as follows:
1. All circuit output wires are EFFECTIVE.
2. Unread output wires are all INEFFECTIVE.
3. All other wires are tentatively set to INEFFECTIVE.
4. Analyze in reverse order: for an output wire v=operator (a,b) or NOT(a)
   a. If v is INEFFECTIVE, do nothing
   b. If v is EFFECTIVE
      i. If operator is NOT: set a to EFFECTIVE
      ii. If operator is XOR: set a,b to EFFECTIVE
      iii. If operator is AND:
         1. If value(a)==1 then set b to EFFECTIVE
         2. If value(b)==1 then set a to EFFECTIVE The reverse order is defined as the reverse of the order in which the operators of the binary circuit 342 were evaluated. The analysis may be repeated, e.g., for K random instantiations of the input wires. Counters 380 may be maintained on how often each wire v is EFFECTIVE, and/or how often each wire is INEFFECTIVE. A wire v with EFFECTIVE>1 and INEFFECTIVE>1 may be considered ineffective.

As an example, the inventors have experimentally observed that when function $f$, 341 is a random bijection on 8 bits, a binary circuit 342 without ineffective faults is usually found after less than 1000 random attempts to compile the binary circuit. If the number of random attempts is increased, then the chance of success increases as well.

Figure 4:
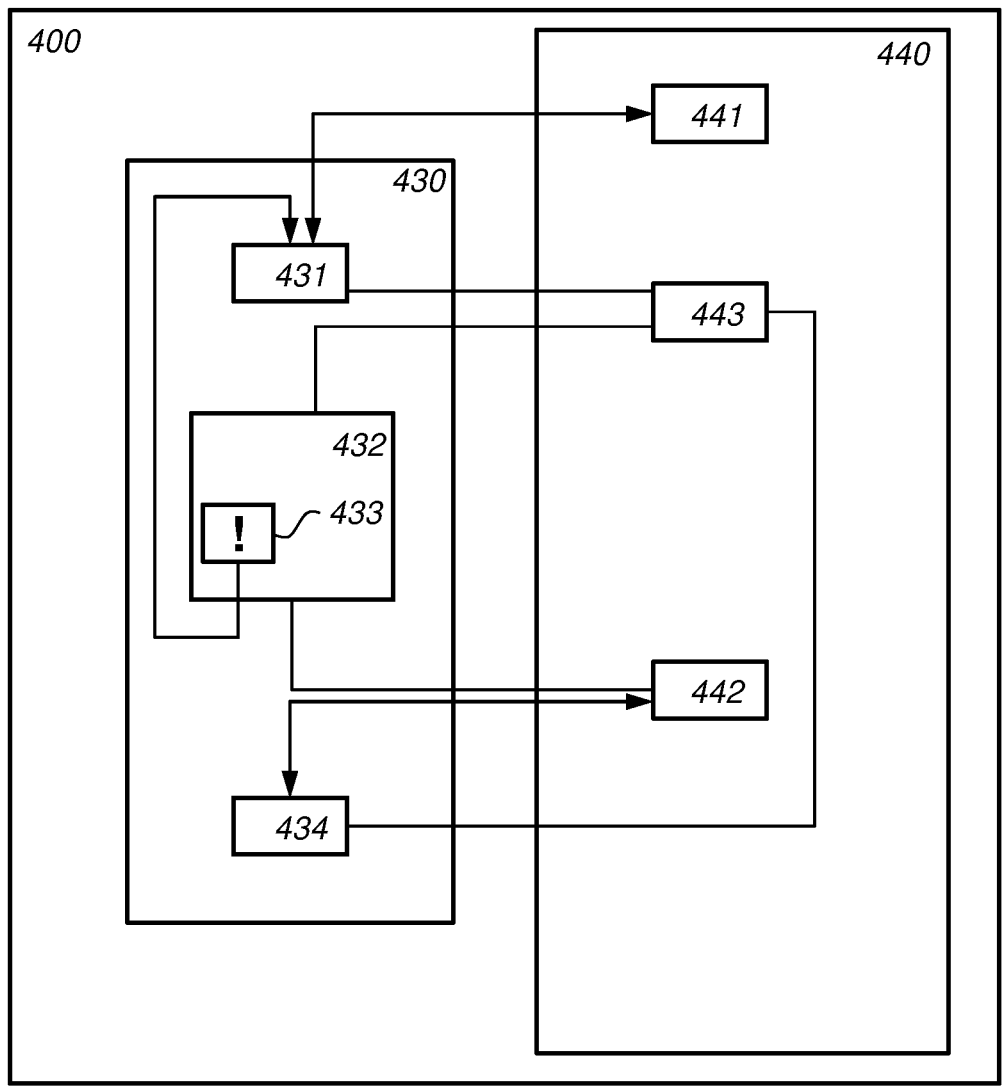

FIG. 4 schematically shows an example of an embodiment of a circuit compiling device 400. Circuit compiling device 400 is for compiling a function 441 into a binary circuit 442. Circuit compiling device 400 may comprise a processor 430 and/or a memory 440. Memory 440 may be used for data and/or instruction storage. For example, memory 440 may comprise software and/or data on which processor 430 is configured to act. Memory 440 may also store binary circuit 442. Processor 430 may be implemented as one or more processor circuits, e.g. microprocessors, ASICs, FPGA and the like. Memory 440 may comprise computer program instructions which are executable by processor 430. Processor 430, possibly together with memory 440, is configured according to an embodiment of a circuit compiler device. For example, circuit compiling device 400 may be based on circuit compiler device 200 or 300.

Circuit compiling device 400 may comprise a circuit compiling unit 432 configured to compile function 441 into binary circuit 442. For example, circuit compiling unit 432 may comprise interpolation unit 231, conjunction compiler unit 232, signaling unit 233, and/or XOR compiler unit 234. Or, circuit compiling unit 432 may comprise interpolation unit 331, conjunction compiler unit 332, signaling unit 333, XOR compiler unit 334, and/or ineffectiveness checking unit 335. As shown in the figure, circuit compiling unit 432 may in particular comprise a signaling unit 433 configured to signal a selection error if no first interpolation term and second interpolation term can be selected for a current interpolation term of function 441, as discussed above.

Interestingly, circuit compiling device 400 may further comprise a bijection unit 431. Bijection unit 431 may select a bijective function R, 443 and compose function $f$, 441 with bijective function R, 443, e.g., $f \circ R$ or $R \circ f$. Circuit compiling unit 432 may then compile binary circuit 442 for composed function $f \circ R$ or $R \circ f$, 441. Circuit compiling device 400 may further comprise a combiner unit 434 configured to combine the compiled binary circuit 442 for composed function 441 with a binary circuit for an inverse $R^{-1}$ of bijective function 443, e.g., $R^{-1} \circ (R \circ f)$ or $(f \circ R) \circ R^{-1}$. As a result, the combined binary circuit 442 may again be a binary circuit for function 441. Interestingly, because circuit compiling unit 432 is applied to the composed function 441, if compiling a binary circuit for the original function is problematic, compiling a binary circuit for composed function 441 may nonetheless succeed and, by combining with a binary circuit for inverse $R^{-1}$, result in a binary circuit for the original function $f$.

In some embodiments, circuit compiling unit 432 first compiles a binary circuit for the original function $f$, 441. This may fail, e.g., signaling unit 433 may signal a selection error and/or an ineffectiveness checking unit of circuit compiling unit 432 may detect ineffective faults. For instance, the ineffectiveness checking unit may detect ineffective faults even after repeating at least the selecting and the compiling of a conjunction compiler unit of circuit compiling unit 432 for a fixed number of times or even for all possible selections by a conjunction compiler unit of circuit compiling unit 432. If compiling the circuit for the original fails, then bijection unit 431 may select a bijective function, compose the function with the bijective function, and/or circuit compiler unit 432 may try to compile the composed function. If this is successful, e.g., leads to a compiled circuit, combiner unit 434 may combine the compiled circuit with a circuit for the inverse of the bijective function. This procedure may be repeated multiple times, e.g., until a binary circuit successfully created and/or until a maximum number of tries has been reached, etcetera. It is also possible to skip the initial compiling for the unmodified function $f$ and to directly start compiling binary circuits for $f$ based on bijections as described herein. In any case, it has been found experimentally that composing with bijective functions is an effective way of decreasing or even practically eliminating the likelihood that a SIFA-projected binary circuit for a function cannot be found.

Bijection unit 431 may select bijective function 443 in various ways, e.g., bijective function 443 may be randomly generated, selected from a hardcoded list, and the like, e.g., randomly or in sequence. Various types of bijective function R, 443 can be used, for instance, random images can be selected for each possible input. Composing the function with the bijective function may comprise, for instance, constructing an input/output table for the composed function from descriptions of the function and the bijective function, e.g. themselves provided as input/output tables. In some embodiments, the bijective function 443 is an affine mapping, e.g., a mapping $x \mapsto Mx+b$ wherein M is a linear transformation and b is a vector. For instance, M may be a matrix of bits with determinant one. Affine mappings may have as an advantage that both the mappings themselves and their inverses are efficiently implementable in binary circuits, e.g., a binary circuit implementing an affine mapping or its inverse may comprise just XOR gates. As already remarked above, the use of XOR gates may be especially beneficial for SIFA protection because they generally do not introduce ineffective faults, e.g., a binary circuit for the inverse of the affine mapping implemented with XOR gates may not have ineffective faults.

Bijection unit 431 may generate the binary circuit for the inverse of the bijective function 443 in various ways. For instance, circuit compiling unit 432 may be used to compile the inverse function into a binary circuit. As discussed above, if bijective function 443 is an affine mapping then the inverse may be an affine mapping as well, in which case generating the binary circuit for the inverse may comprise generating XOR gates corresponding to the mapping as described above. Combining the compiled binary circuit for the composed function with a binary circuit for an inverse of the bijective function may comprise connecting input wires of the binary circuit for the composed function with output wires of the circuit for the inverse or connecting output wires of the binary circuit for the composed function with input wires of the circuit for the inverse, depending on how the two functions are composed.

Figure 5:
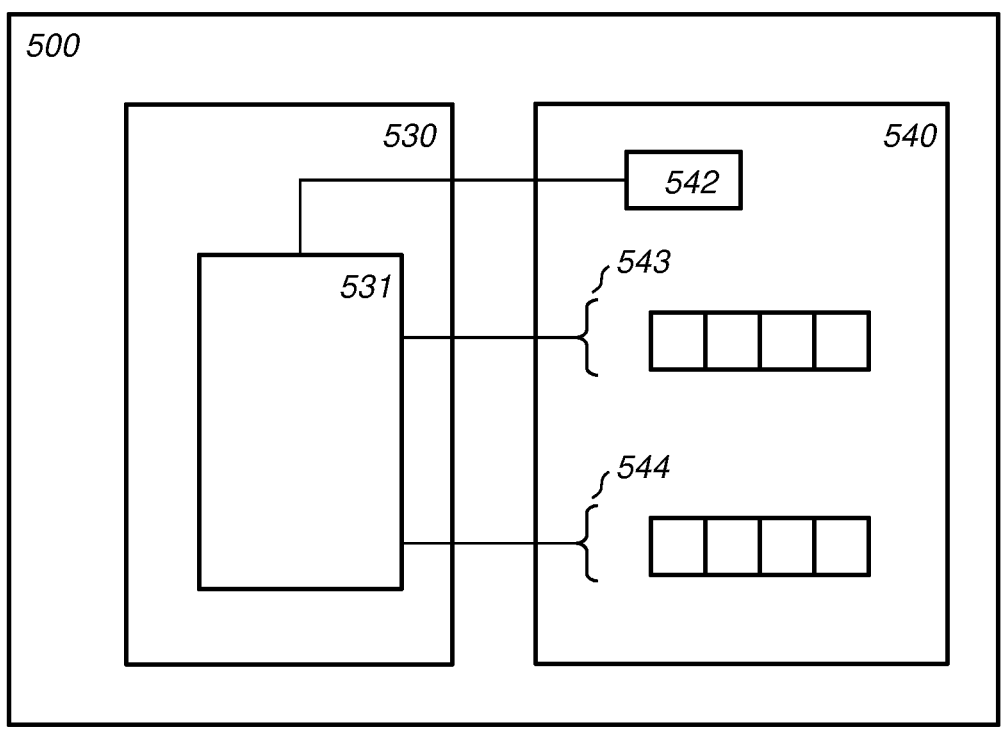

FIG. 5 schematically shows an example of an embodiment of a function evaluation device 500. Function evaluation device 500 is for evaluating a function. Function evaluation device 500 may comprise a processor 530 and/or a memory 540. Memory 540 may be used for data and/or instruction storage. For example, memory 540 may comprise software and/or data on which processor 530 is configured to act. Processor 530 may be implemented as one or more processor circuits, e.g. microprocessors, ASICs, FPGA and the like. Memory 540 may comprise computer program instructions which are executable by processor 530. Processor 530, possibly together with memory 540, is configured according to an embodiment of a function evaluation device.

Memory 540 may be configured to store a binary circuit 542 for the function to be evaluated. The function may compute one or more function output bits from a plurality of function input bits. Each function output bit being may be representable as a sum of interpolation terms. An interpolation term may be a product of zero or more function input bits. The plurality of function input bits and the interpolation terms of the one or more function output bits together may form a plurality of interpolation terms. Binary circuit 542 may comprise:

- circuit wires including a plurality of circuit input wires corresponding to the plurality of function input bits and/or one or more circuit output wires corresponding to the one or more function output bits;
- one or more conjunction subcircuits each computing a conjunction of at least two function input bits. A conjunction subcircuit may provide a circuit wire corresponding to a current interpolation term as a conjunction of a first circuit wire corresponding to a first interpolation term and a second circuit wire corresponding to a second interpolation term; and/or
- one or more XOR subcircuits each computing a function output bit. The function output bit computed by a current XOR subcircuit may be representable as a sum of current interpolation terms. The current XOR subcircuit may provide a circuit output wire corresponding to the function output bit as a XOR of wires corresponding to said current interpolation terms.

For example, binary circuit 542 may be binary circuit 100, 100', or 100" described above. The binary circuit may be represented in memory 540 in various ways, e.g., as an explicit list of gates or subcircuits or as a set of instructions to be carried out by processor 540 or by an interpreter executable by processor 540. In some embodiments, binary circuit 542 comprises at least a partial ordering of gates and/or subcircuits of the binary circuit 542 defining an order in which the circuit is to be evaluated.

Interestingly, binary circuits as described here have a reduced chance and/or number of ineffective faults, allowing function evaluation device 500 to evaluate the function computed by binary circuit 542 with reduced susceptibility to SIFA-like attacks. In some embodiments, binary circuit 542 has no ineffective faults, further improving SIFA protection.

Processor 530 may be configured to obtain the plurality of input bits, e.g., to obtain values for each of the plurality of input bits. The values may be provided by another unit of the device, by a user via a user interface of function evaluation device 500, by another device, etcetera. Function evaluation device 500 may comprise a circuit evaluation unit 531 configured to evaluate the function on the plurality of input bits. Techniques for evaluating binary circuits may be used that are known per se. Circuit evaluation unit 531 may evaluate the binary circuit according to a provided partial ordering or ordering as described above. Evaluating the binary circuit may result in values of the one or more output bits. For example, the values may be provided to another unit of function evaluation device 500, to another device, or to a user via a user interface of function evaluation device 500.

In some embodiments, the techniques described herein to compile a function into a binary circuit 242, 342, 442 and/or compute the function by evaluating the binary circuit 542 are beneficially combined with techniques to compile functions into computation on shares and/or to compute a function based on shares. For example, the binary circuit may be a first part of an overall computation. This first part may be compiled into a binary circuit, e.g., as described for circuit compiling devices 200, 300, 400 and/or evaluated as a binary circuit, e.g., as described for function evaluation device 500. The second part may be compiled into a computation performed on shares and/or evaluated on shares as described below.

Combining binary circuits with shares may have as an advantage that the binary circuit-based techniques described herein may be applied to computation parts on which they work well, e.g., functions on which circuit compiling devices 200, 300, 400 are able to construct a more SIFA-resistant circuit. The share-based techniques described below may be applied to other computation parts, e.g., computation parts on which circuit compiling devices 200, 300, 400 are not able to find or not expected to efficiently construct a more SIFA-resistant circuit. For example, the first part may be a bijective function such as an encoded AES S-box or various other examples described above. The second part may be, e.g., a non-bijective function such as an AES addition circuit. Hence, efficient binary circuit-based techniques can be used when possible while possibly less efficient share-based techniques can be used when needed.

For instance, function evaluation device 500 may evaluate the second computation part on shares by performing the second computation part on at least a set of values, wherein memory 540 stores the set of values. Each of these values may be stored as a plurality of shares that define the value. Processor 530 may be configured to perform an operation of the computation on a set of input values of the set of values to obtain an output value of the set of values. For example, the computation may be given as a binary circuit wherein processor 530 performs the operations of the computation according to the gates of the binary circuit. The output value may be defined by at least one shared share and at least one computed share. The at least one shared share may also define a further value, e.g., an output of a previous operation of the computation performed previous to the operation. Performing the operation may comprise computing the at least one computed share from the at least one shared share and shares of the set of input values.

A value $z_i$ stored as a plurality of shares $s_{i,j}$ may be defined by this plurality of shares by means of a reconstruction function that computes the value from the plurality of shares. For instance, a value $v_i$ and its shares $s_{i,1}, \ldots, s_{i,n}$ may be bits, the reconstruction function for the value being defined as the exclusive-or (XOR) $v_i = s_{i,1}$ xor ... xor $s_{i,n}$ of the shares.

The operation may be performed based on a shared share that also defines an output of an operation of the computation performed previous to the current operation. The at least one shared share may not need to be recomputed and/or modified as part of the current operation. The at least one computed share may be computed from the previously computed shared share and shares of the set of input values of the operation.

For instance, the operation may be an AND operation. Input value $z_k$, may be stored as shares $z_k = s_{k,0}$ xor $s_{k,1}$. Input value $z_l$ may be stored as shares $z_l = s_{l,0}$ xor $s_{l,1}$. Output value $z_j = z_k$ and $z_l$ may be stored after the operation as shares $z_j = s_{j,0}$ xor $s_{j,1}$, where $s_{j,0}$ is a shared share and $s_{j,1}$ is a computed share. Computing the computed share may comprise computing one or more ANDS of shares of the first value and shares of the second value, for example, each pair of a share of the first value and a share of the second value. The shares of the first and second value may also be partially combined, e.g., an AND may be computed of a XOR of multiple shares of the first value with one or more shares of the second value, and the like. Computing the computed share may then further comprise XORing the shared share with the compute one or more ANDs.

For example, processor 530 may use the following steps to perform AND operation, with intermediate results denoted by variables $c_i$:

1. $c_0 = s_{k,1}$ and $s_{l,1}$
2. $c_4 = s_{j,1}$ xor $c_0$
3. $c_1 = s_{k,0}$ and $s_{l,1}$
4. $c_5 = c_4$ xor $c_1$
5. $c_2 = s_{k,1}$ and $s_{l,0}$
6. $c_6 = c_5$ xor $c_2$
7. $c_3 = s_{k,0}$ and $s_{l,0}$
8. $s_{j,0} = c_6$ xor $c_3$ As will be understood, the above example may be adapted in various ways while still achieving the same result, e.g., by changing the order of the steps and/or swapping shares of input values.

The operation performed on shares may also be a XOR operation. Input value $z_k$ may be stored as shares $z_k = s_{k,0}$ xor $s_{k,1}$. Input value $z_l$ may be stored as shares $z_l = s_{l,0}$ xor $s_{l,1}$. Output value $z_j = z_k$ xor $z_l$ may be stored after the operation as shares $z_j = s_{j,0}$ xor $s_{j,1}$, where $s_{j,0}$ is a shared share and $s_{j,1}$ is a computed share. Performing the XOR operation may comprise computing multiple XORs of the shared share, shares of the input values, and/or intermediate results from computing said XORs. For example, the following steps may be used to perform the XOR operation, with intermediate results denoted by variables $c_i$:

1. $c_0 = s_{j,1}$ xor $s_{k,1}$
2. $c_1 = c_0$ xor $s_{l,1}$
3. $c_2 = c_1$ xor $s_{k,0}$
4. $s_{j,0} = c_2$ xor $s_{l,0}$ Interestingly, each share defining the output value may also define a respective further value. For instance, not only the shared share as above is shared but also the computed share is shared. For example, the computed share may take on the role of a shared share in a later operation, e.g., the output value serves as a further value for that later operation.

This may have as an advantage that also in the computation based on shares, the likelihood of ineffective faults in shares of the output value is decreased and/or it is made harder to find ineffective faults. If the computed share does not define a further value, it may be a particularly likely candidate for an effective fault since a fault in the share may only directly affect the current output value. However, if computed share does define a respective further value, this may make it more likely that a fault in the computed share affect the overall computation output by changing the output value and/or the respective further value. For example, a fault in the computed share is more likely to be effective, e.g., it is more likely that for all inputs the fault affects the output, or it may be harder to detect that the fault is ineffective, for instance since there are few inputs for which the output is not affected.

In some embodiments, for each operation of the computation or each operation of a particularly sensitive part of the computation, each share of each output of an operation of the computation or computation part may also define a respective further value. Preferably, the respective further values may be chosen such that flipping both the output value and the corresponding further value changes the output of the overall computation, for any input of the overall computation, and/or the shares of the further value are used after the operation. The sensitive part of the computation may be preceded and/or succeeded by dummy computations on shares, e.g., computation of an AES rounds and its inverse with a random round key, in order to ensure that there are sufficient further values that the output values of the operations of the sensitive part can share shares with.

For some type of computations, in this way ineffective faults may be completely eliminated from the sensitive part of the computation that operates on shares, or at least made unlikely. For example, the computation may comprise the evaluation of a block cipher such as AES. For instance, the computation may comprise an encoded substitution box, e.g., an AES S-box. Such an S-box may be considered as a binary circuit with 8 input bits and 8 output bits, optionally encoded byte-wise, e.g., on the 8 bits combined into a byte. The computation may instead or in addition comprise an encoded addition circuit, e.g., of the AES MixColumns operation. Using a byte-wise encoding, the addition may be regarded as a circuit with 16 input bits and 8 output bits. Using a nibble-wise encoding, the addition may be regarded as a circuit with 8 input bits and 4 output bits. For instance, for operations of one or more of such sub-computations, each share defining an output value also defines a respective further value. The respective further value in AES-related embodiments may belong to an AES state, e.g., an AES state of a different part of the plaintext. By construction of the AES function, this may guarantee that any fault in such a shared share result in a modified ciphertext.

Evaluating the second computation part on shares may further comprise obtaining shares of one or more values, e.g., inputs of the second computation part, and/or reconstructing values from their shares, e.g., outputs of the second computation part. Sharing a value into its shares typically comprises computing the shares of the value from the value using one or more randomizing inputs, e.g., values or other shares or other intermediate values. For instance, the randomizing inputs may help to ensure that no single share, or sometimes even no strict subset of shares, depends on the value in a predictable way. Various ways of sharing, e.g., secret-sharing, values are known, e.g., using k−1 randomizing input bits $r_1, \ldots, r_{k-1}$, a bit V may be shared as $(r_1, \ldots, r_{k-1}, r_k = V \oplus r_1 \oplus \ldots \oplus r_{k-1})$, and the like. Reconstruction may comprise applying a reconstruction function to respective pluralities of shares representing respective values. For instance, reconstruction may comprise computing a XOR of shares, and the like.

As discussed above, various circuit compiling devices, e.g., device 200, 300, or 400, may be configured to compile the second part into a computation performed on shares. The compiling may comprise generating instructions to cause a processor system to perform the second computation part on shares. The second computation part may be on at least a set of values. Memory 240, 340, 440 may be configured to store addressing information for the set of values. Each value of the set of values may be a shared value represented by a plurality of shares. Addressing information for a shared value may comprise share addresses for a plurality of shares of the shared value.

Processor 230, 330, 430 may be configured to generate a set of instructions to perform an operation of the computation. The operation may be on a set of input values to obtain an output value as described above. The input values and the output value may be shared values. For instance, the processor may select a share address of share of a further shared value different from the input values, the further value being an output of a previous operation of the second computation part. The processor may generate instructions for computing the at least one computed share from the at least one shared share and shares of the set of input values.

The memory of the circuit compiling device may be configured to store addressing information for the values in an addressing space. The values may be shared shares. Addressing information for a shared value may comprise share addresses for a plurality of shares of the value. For example, a share address may comprise one or more of a memory address, an array index, and a variable name of the share. For example, instructions generated by the circuit compiling device may comprise loading instructions, e.g., for reading from a memory at the memory address, for reading an array at the array index, or for reading the variable. Instructions generated by the circuit compiling device may also comprise storing instructions, e.g., instructions for writing to a memory at the memory address, for writing to an array at the array, or for writing to the variable.

The processor of the circuit compiling device may generate a set of instructions to perform an operation of the computation to be performed. For instance, the processor may store the resulting instructions in a memory of the circuit compiling device. The processor may generate such instructions for multiple operations, e.g., each operation of the second computation part, e.g., from a circuit of the second computation part.

In order to generate the set of instructions, the processor may be configured to select a share address of share of a further value different from the input values. For example, the processor may have previously generated instructions for computing this share as a share of an output value of another operation, e.g., of the second computation part. The share address may be an address of an output value of the other operation. Various considerations for selecting further share have been discussed above, e.g., preferably, the respective further values may be chosen such that flipping both the output value and the corresponding further value changes the output of the overall computation, for any input of the overall computation, and/or the shares of the further value are used after the operation.

Interestingly, it may be ensured that, for each operation of the second computation part or each operation of a particularly sensitive part of the second computation part, each share of each output of an operation of the computation or computation part may also define a respective further vale. For example, the processor may generate instructions to perform dummy computations, e.g., an AES round and its inverse using a random key, to be performed before or after the second computation part or the sensitive part, the dummy computations sharing shares with the second computation part or sensitive part in order to ensure that each share of each output of an operation also defines a further value.

The processor may be configured to generate, using the share address, the instructions. The instructions may be for computing the at least one computed share from the at least one shared share and shares of the set of input values. For instance, the instructions may be instructions in assembly code or in a programming language, e.g., a compiled language such as C or an interpreted language such as Python. The instructions typically comprise load instructions for obtaining the shares of the operation input values and/or the share of the further shared value. The instructions typically also comprise store instructions for storing the shares of the operation output value.

The processor may be further configured to collect the generated instructions for various operations, e.g., for operations of the computation and/or additional operations as discussed above, into an overall set of instructions to cause a processor system to perform the second computation part. The processor may further represent the binary circuit as a further set of instructions for performing the first computation part, and/or combine the overall set of instructions with the further set of instructions to obtain a set of instructions for performing the overall computation.

The execution of the various devices described herein may implemented in a processor, e.g., a processor circuit, examples of which are shown herein. FIG. 2-5 show functional units that may be functional units of the processor. For example, each FIG. 2-5 may be used as a blueprint of a possible functional organization of the processor. For example, the functional units shown in FIG. 2-5 may be wholly or partially be implemented in computer instructions that are stored at the respective devices, e.g., in an electronic memory of a respective device 200, 300, 400, 500, and are executable by a microprocessor of the device. In hybrid embodiments, functional units are implemented partially in hardware, e.g., as coprocessors, e.g., crypto coprocessors, and partially in software stored and executed on device 200, 300, 400, 500.

The circuit compiling and function evaluation devices may have a user interface, which may include well-known elements such as one or more buttons, a keyboard, display, touch screen, etc. The user interface may be arranged for accommodating user interaction for compiling a function into a binary circuit or evaluating a function as a binary circuit.

Memory 240, 340, 440, 540 may be implemented as an electronic memory, say a flash memory, or magnetic memory, say hard disk or the like. The memory may comprise multiple discrete memories together making up the memory, e.g., the memory may be distributed over multiple distributed sub-memories. The memory may also be a temporary memory, say a RAM. In the case of a temporary memory, the memory contains some means to obtain data before use, say by obtaining them over an optional network connection (not shown). The memory may have volatile and a non-volatile part. Part of the memory may be read-only. Memory 240, 340, 440, 540 may be a storage.

Typically, devices 200, 300, 400, 500 each comprise a microprocessor which executes appropriate software stored at the respective devices; for example, that software may have been downloaded and/or stored in a corresponding memory, e.g., a volatile memory such as RAM or a non-volatile memory such as Flash. Alternatively, the devices may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, the circuit compiling device comprises an interpolation circuit, a conjunction compiler circuit, as signaling circuit, and/or a XOR compiler circuit. The circuit compiling device may comprise additional circuits, e.g., an ineffectiveness checking circuit, a bijection circuit, and/or a combiner circuit. In an embodiment, the function evaluation device comprises a circuit evaluation circuit. The circuits implement the corresponding units described herein. The circuits may be a processor circuit and storage circuit, the processor circuit executing instructions represented electronically in the storage circuits. A processor circuit may be implemented in a distributed fashion, e.g., as multiple subprocessor circuits. The circuits may also be, FPGA, ASIC or the like.

Figure 6A:
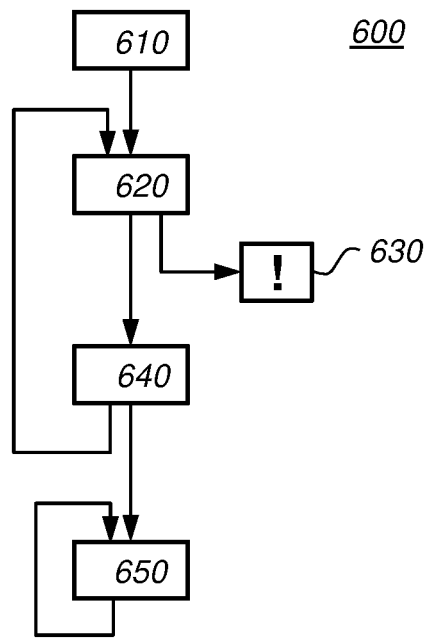

FIG. 6a schematically shows an example of an embodiment of a circuit compiling method 600. Circuit compiling method 600 may be for compiling a function into a binary circuit. The function may compute one or more function output bits from a plurality of function input bits. The binary circuit may comprise circuit wires including a plurality of circuit input wires corresponding to the plurality of function input bits and one or more circuit output wires corresponding to the one or more function output bits. The binary circuit may further comprise one or more conjunction subcircuits each computing a conjunction of at least two function input bits and one or more XOR subcircuits each computing a function output bit.

Circuit compiling method 600 may comprising representing 610 each function output bit as a sum of interpolation terms. An interpolation term may be a product of zero or more function input bits. The plurality of function input bits and the interpolation terms of the one or more function output bits may together form a plurality of interpolation terms.

Circuit compiling method 600 may further comprise, for each current interpolation term of the plurality of interpolation terms, if the current interpolation term is a product of multiple function input bits, selecting 620 a first interpolation term and a second interpolation term from the plurality of interpolation terms. The current interpolation term may be computable as a product of the first interpolation term and the second interpolation term. Selecting 620 may comprise signaling 630 a selection error if no first interpolation term and second interpolation term can be selected.

Circuit compiling method 600 may further comprise compiling 640 a conjunction subcircuit of the binary circuit computing the current interpolation term, comprising providing a circuit wire corresponding to the current interpolation term as a conjunction of a first circuit wire corresponding to the first interpolation term and a second circuit wire corresponding to the second interpolation term.

Circuit compiling method 600 may further comprise compiling one or more XOR subcircuits of the binary circuit. The function output bit computed by a current XOR subcircuit may be represented as a sum of current interpolation terms. Compiling 650 the current XOR subcircuit may comprise providing a circuit output wire corresponding to the function output bit as a XOR of wires corresponding to said current interpolation terms.

Figure 6B:
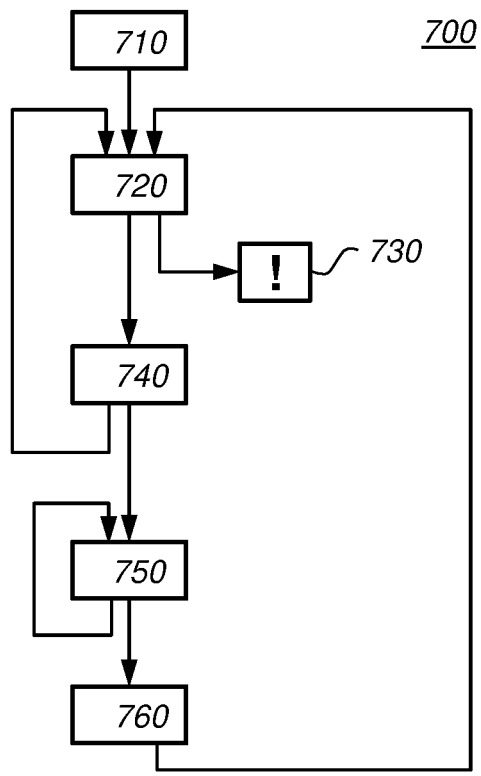

FIG. 6b schematically shows an example of an embodiment of a circuit compiling method 700. Circuit compiling method 700 may be based on circuit compiling method 600, e.g., circuit compiling method 700 may comprise representing 710 function output bits, selecting 720 a first and second interpolation term, signaling 730 a selection error, compiling 740 a conjunction subcircuit, and/or compiling 750 a current XOR subcircuit analogously to the corresponding steps of circuit compiling method 600.

Interestingly, circuit compiling method 700 may further comprise determining 760 whether the binary circuit has an ineffective fault and, if the binary circuit has an ineffective fault, repeat at least the selecting 720 and the compiling 740 for one or more current interpolation terms. Thereby, SIFA protection may be improved as discussed with respect to circuit compiling device 300.

Figure 6C:
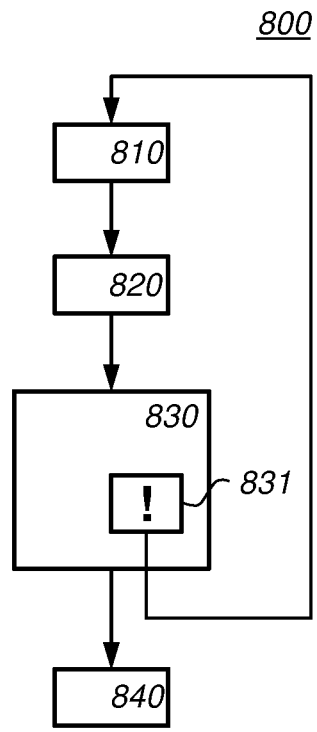

FIG. 6c schematically shows an example of an embodiment of a circuit compiling method 800. Circuit compiling method 800 may comprise selecting 810 a bijective function. Circuit compiling method 800 may further comprise composing 820 the function with the bijective function. Circuit compiling method 800 may also comprise compiling 830 a binary circuit for the composed function. The compiling 830 may comprise signaling 831 a selection error. For example, compiling 830 may comprise circuit compiling method 600 or 700. Circuit compiling method 800 may further comprise repeating the selecting 810, the composing 820, and the compiling 830 if a selection error is signaled. Circuit compiling method 800 may further comprise combining 840 the compiled binary circuit for the composed function with a binary circuit for an inverse of the bijective function. In an embodiment, circuit compiling method starts with a compiling 830 the original function and only performs the selecting 810, composing 820, and/or combining 840 if compiling the original function fails to produce a binary circuit, e.g., fails to produce a circuit without ineffective faults.

Figure 6D:
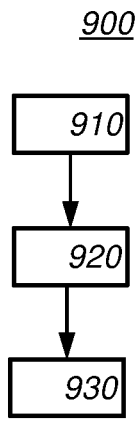

FIG. 6d schematically shows an example of an embodiment of a function evaluation method 900. Function evaluation method 900 may be for evaluating a function. The function may compute one or more function output bits from a plurality of function input bits. Each function output bit may be representable as a sum of interpolation terms. An interpolation term may be a product of zero or more function input bits. The plurality of function input bits and the interpolation terms of the one or more function output bits may together form a plurality of interpolation terms.

Function evaluation method 900 may comprise obtaining 910 a binary circuit for the function. The binary circuit may comprise:
- circuit wires including a plurality of circuit input wires corresponding to the plurality of function input bits and/or one or more circuit output wires corresponding to the one or more function output bits;
- one or more conjunction subcircuits each computing a conjunction of at least two function input bits. A conjunction subcircuit may provide a circuit wire corresponding to a current interpolation term as a conjunction of a first circuit wire corresponding to a first interpolation term and a second circuit wire corresponding to a second interpolation term; and/or
- one or more XOR subcircuits each computing a function output bit. The function output bit computed by a current XOR subcircuit may be representable as a sum of current interpolation terms. The current XOR subcircuit may provide a circuit output wire corresponding to the function output bit as a XOR of wires corresponding to said current interpolation terms.

Function evaluation method 900 may further comprise obtaining 920 the plurality of input bits. Function evaluation method 900 may also comprise evaluating 930 the function on the plurality of input bits by evaluating the binary circuit.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 640 and 650 may be executed, at least partially, in parallel. Moreover, a given step may not have finished completely before a next step is started.

Embodiments of the methods may be executed using software, which comprises instructions for causing a processor system to perform method 600, 700, 800, and/or 900. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiments of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

FIG. 7a shows a computer readable medium 1000 having a writable part 1010 comprising a computer program 1020, the computer program 1020 comprising instructions for causing a processor system to perform a circuit compiling method and/or a function evaluation method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said circuit compiling and/or function evaluation method.

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., circuit compiling device 200, 300, 400 or function evaluation device 500, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:
1. A circuit compiling device comprising:
   a memory circuit,
      wherein the memory circuit is configured to store a circuit,
      wherein the circuit comprises a plurality of circuit wires and at least one conjunction subcircuit(s),
      wherein the circuit wires comprise input wires and at least one output wire(s),
      wherein the input wires correspond to a plurality of function input bits,
      wherein the at least one output wires(s) correspond to at least one function output bit(s),
      wherein the at least one function output bit(s) comprise a first function output bit,
      wherein the at least one conjunction subcircuit(s) comprises a first conjunction subcircuit,
      wherein each of the at least one conjunction subcircuit(s) is arranged to compute a conjunction of at least two function input bits and at least one XOR subcircuit(s),
      wherein each of the at least one XOR subcircuit(s) is arranged to compute the first function output bit;
   a processor circuit,
      wherein the processor circuit is configured to compile a function into the circuit,
         wherein the function computes the at least one function output bit(s) from the plurality of function input bits,
      wherein the processor circuit is configured to represent each of the at least one function output bit(s) as a sum of interpolation terms,
         wherein each of the sum of interpolation terms is a product of zero or more of the function input bits, wherein the plurality of function input bits and the interpolation terms form a plurality of interpolation terms;

wherein the processor circuit is configured to select a first interpolation term and a second interpolation term from the plurality of interpolation terms for each current interpolation term of the plurality of interpolation terms, when the current interpolation term is a product of multiple function input bits, wherein the current interpolation term is computed as a product of the first interpolation term and the second interpolation term, wherein the current interpolation term is arranged to signal a selection error if no first interpolation term and second interpolation term can be selected; and wherein the processor circuit is configured to compile the first conjunction subcircuit for each current interpolation term of the plurality of interpolation terms, when the current interpolation term is a product of multiple function input bits, wherein the first conjunction subcircuit computes the current interpolation term, wherein the compiling of the first conjunction subcircuit comprises providing a circuit wire corresponding to the current interpolation term as a conjunction of a first circuit wire corresponding to the first interpolation term and a second circuit wire corresponding to the second interpolation term; and wherein the processor circuit is configured to compile at least one XOR subcircuit(s), wherein the first function output bit is computed by a current XOR subcircuit, wherein the first function output bit is represented as a sum of current interpolation terms, wherein compiling the current XOR subcircuit comprises providing an output wire of the at least one output wires(s) corresponding to the first function output bit as a XOR of wires corresponding to the current interpolation terms.

2. The circuit compiling device according to claim 1, wherein each circuit wire corresponds to a current interpolation term is used in the at least one XOR subcircuit(s) of the circuit.

3. The circuit compiling device according to claim 1, wherein the processor circuit is configured to determine whether the circuit has an ineffective fault, wherein the processor circuit is configured to repeat at least the selecting and the compiling of at least one current interpolation terms if the circuit has an ineffective fault.

4. The circuit compiling device according to claim 3, wherein determining if the circuit has an ineffective fault comprises:

for each instantiation of a plurality of instantiations of the plurality of input wires, determining a subset of the circuit wires, wherein the subset of circuit wires comprises a bit flip affects at least one output wire of the at least one output wires(s); and determining that the circuit has an ineffective fault if at least one circuit wire of the subset of the circuit wires is a portion of a first instantiation of the plurality of instantiations but is not a portion of a second instantiation of the plurality of instantiations.

5. The circuit compiling device according to claim 1,
wherein the processor circuit is configured to select a bijective function, wherein the processor circuit is configured to compose the function with the bijective function, wherein the processor circuit is configured to combine the compiled circuit for the composed function with a circuit so as to create an inverse of the bijective function.

6. The circuit compiling device according to claim 5, wherein the processor circuit is configured to repeat the selecting of the bijective function, the composing of the function with the bijective function, and the compiling of the composed function if a selection error is signaled.

7. The A circuit compiling device according to claim 1, wherein the function comprises a substitution box of a symmetric key algorithm.

8. The circuit compiling device according to claim 1, wherein the function is injective.

9. The circuit compiling device according to claim 1, wherein at most one circuit wire corresponds to each interpolation term.

10. A compiling method for compiling a function into a binary circuit, wherein function computes at least one function output bit(s) from a plurality of function input bits, wherein the circuit comprises a plurality of circuit wires and at least one conjunction subcircuit(s), wherein the circuit wires comprise a plurality of input wires and at least one output wire(s), wherein the input wires correspond to the plurality of function input bits, wherein the at least one output wire(s) correspond to the at least one function output bit(s), wherein the at least one function output bit(s) comprise a first function output bit, wherein the comprises at least one conjunction subcircuit (s), wherein the at least one conjunction subcircuit(s) comprises a first conjunction subcircuit, wherein each of the at least one conjunction subcircuit(s) is arranged to compute a conjunction of at least two function input bits and at least one XOR subcircuit(s), wherein each of the at least one or more XOR subcircuit (s) are arranged to compute the function output bit, the circuit compiling method comprising:

representing each of the at least one function output bit(s) as a sum of interpolation terms, wherein each of interpolation terms is a product of zero or more function input bits, wherein the plurality of function input bits and the interpolation terms of the at least one function output bit(s) together form a plurality of interpolation terms;

selecting a first interpolation term and a second interpolation term from the plurality of interpolation terms for each current interpolation term of the plurality of interpolation terms, when the current interpolation term is a product of multiple function input bits, wherein the current interpolation term is computed as a product of the first interpolation term and the second interpolation term, wherein the current interpolation term is arranged to signaling a selection error if no first interpolation term and second interpolation term can be selected;

compiling the first conjunction subcircuit computing the current interpolation term for each current interpolation term of the plurality of interpolation terms, if the current interpolation term is a product of multiple function input bits, wherein the compiling the first conjunction subcircuit comprises providing a circuit wire corresponding to the current interpolation term as a conjunction of a first circuit wire corresponding to the first interpolation term and a second circuit wire corresponding to the second interpolation term; and compiling at least one XOR subcircuit(s) for each current interpolation term of the plurality of interpolation terms, if the current interpolation term is a product of multiple function input bits,
  wherein the first function output bit is computed by a current XOR subcircuit is represented as a sum of current interpolation terms,
  wherein the compiling of the current XOR subcircuit comprises providing an output wire of the at least one output wires(s) corresponding to the function output bit as a XOR of wires corresponding to the current interpolation terms.

11. A function evaluation device comprising:
a memory circuit,
  wherein the memory circuit is configured to store a function and circuit,
  wherein the function is arranged to compute at least one function output bit(s) from a plurality of function input bits,
  wherein each function output bit is representable as a sum of interpolation terms,
  wherein each of the sum of interpolation term is a product of zero or more function input bits,
  wherein the plurality of function input bits and the interpolation terms forming a plurality of interpolation terms,
  wherein the circuit comprises:
    circuit wires,
      wherein the circuit wires comprise a plurality of input wires and at least one circuit output wire(s),
      wherein the plurality of input wires correspond to the plurality of function input bits,
      wherein the at least one output wire(s) correspond to the at least one function output bit(s);
    at least one conjunction subcircuit(s),
      wherein the at least one conjunction subcircuit(s) comprises a first conjunction subcircuit,
    wherein each of the at least one or more conjunction subcircuit(s) is arranged to compute a conjunction of at least two function input bits,
    wherein the first conjunction subcircuit is arranged to provide a circuit wire corresponding to a current interpolation term as a conjunction of a first circuit wire,
      wherein the first circuit wire corresponds to a first interpolation term,
      wherein the second circuit wire corresponds to a second interpolation term; and
    at least one XOR subcircuit(s),
      wherein each of the at least one XOR subcircuit(s) is arranged to compute the first function output bit,
      wherein the first function output bit is computed by a current XOR subcircuit,
      wherein the first function output bit is represented as a sum of current interpolation terms,
      wherein the current XOR subcircuit provides an output wire of the at least one output wires(s) corresponding to the function output bit as a XOR of wires corresponding to the current interpolation terms; and a processor circuit,
  wherein the processor circuit is configured to obtain the plurality of input bits, wherein the processor circuit is configures to evaluate the function on the plurality of input bits by evaluating the circuit.

12. The function evaluation device as in claim 11, wherein the circuit has no ineffective faults.

13. A function evaluation method for evaluating a function,
  wherein the function computes at least one function output bit(s) from a plurality of function input bits,
  wherein each function output bit of the at least one function output bit(s) is represented as a sum of interpolation terms,
  wherein each interpolation term of the sum of interpolation terms is a product of zero or more function input bits,
  wherein the plurality of function input bits and the interpolation terms of the at least one function output bit(s) together form a plurality of interpolation terms, the function evaluation method comprising:
obtaining a circuit for the function, the binary circuit comprising:
  circuit wires,
    wherein the circuit wires comprise a plurality of input wires and at least one circuit output wire(s),
    wherein the plurality of input wires correspond to the plurality of function input bits,
    wherein the at least one output wire(s) correspond to the at least one function output bit(s);
  at least one conjunction subcircuit(s),
    wherein the at least one conjunction subcircuit(s) comprises a first conjunction subcircuit,
    wherein each of the at least one or more conjunction subcircuit(s) is arranged to compute a conjunction of at least two function input bits,
    wherein the first conjunction subcircuit is arranged to provide a circuit wire corresponding to a current interpolation term as a conjunction of a first circuit wire,
      wherein the first circuit wire corresponds to a first interpolation term,
      wherein the second circuit wire corresponds to a second interpolation term; and
  at least one XOR subcircuit(s),
    wherein each of the at least one XOR subcircuit(s) is arranged to compute the first function output bit,
    wherein the first function output bit is computed by a current XOR subcircuit,
    wherein the first function output bit is represented as a sum of current interpolation terms,
    wherein the current XOR subcircuit providing a output wire of the at least one output wires(s) corresponding to the function output bit as a XOR of wires corresponding to the current interpolation terms;
obtaining the plurality of input bits; and
evaluating the function on the plurality of input bits by evaluating the circuit.

14. A computer program stored on a non-transitory, wherein the computer program when executed on a processor performs the method as claimed in claim 10.

15. A computer program stored on a non-transitory medium, wherein the computer program when executed on a processor performs the method as claimed in claim 13.

16. A circuit compiling method according to claim 10, wherein each circuit wire corresponds to a current interpolation term is used in the at least one XOR subcircuit(s) of the circuit.

17. A circuit compiling method according to claim 10, further comprising:
   determining whether the circuit has an ineffective fault; and
   repeating at least the selecting and the compiling of at least one current interpolation terms if the circuit has an ineffective fault.

18. A circuit compiling method according to claim 17, wherein the determining if the circuit has an ineffective fault comprises:
   for each instantiation of a plurality of instantiations of the plurality of input wires, determining a subset of the circuit wires, wherein the subset of circuit wires comprises a bit flip affects at least one output wire of the at least one output wires(s); and
   determining that the circuit has an ineffective fault if at least one circuit wire of the subset of the circuit wires is a portion of a first instantiation of the plurality of instantiations but is not a portion of a second instantiation of the plurality of instantiations.

19. A circuit compiling method according to claim 10, further comprising:
   selecting a bijective function;
   composing the function with the bijective function; and
   combining the compiled circuit for the composed function with a circuit so as to create an inverse of the bijective function.

20. A circuit compiling method according to claim 19, further comprising repeating the selecting of the bijective function, the composing of the function with the bijective function, and the compiling of the composed function if a selection error is signaled.

* * * * *